(12) United States Patent
Prager et al.

(10) Patent No.: US 10,035,623 B1
(45) Date of Patent: Jul. 31, 2018

(54) PACKAGE FOR DRONE DELIVERY

(71) Applicant: X Development LLC, Mountain View, CA (US)

(72) Inventors: Andre Prager, Sunnyvale, CA (US); Clark Sopper, Redwood City, CA (US); Kyle A. Liske, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 6 days.

(21) Appl. No.: 15/241,721

(22) Filed: Aug. 19, 2016

(51) Int. Cl.
| | |
|---|---|
| *B65D 5/46* | (2006.01) |
| *B65D 5/42* | (2006.01) |
| *B65D 5/20* | (2006.01) |
| *B64D 1/22* | (2006.01) |
| *B64C 39/02* | (2006.01) |

(52) U.S. Cl.
CPC ............. *B65D 5/4208* (2013.01); *B64D 1/22* (2013.01); *B65D 5/2033* (2013.01); *B65D 5/4266* (2013.01); *B64C 39/024* (2013.01); *B64C 2201/128* (2013.01)

(58) Field of Classification Search
CPC .. B65D 5/4208; B65D 5/2033; B65D 5/4266; B65D 2571/00487; B65D 5/20; B65D 81/00; B64D 1/22
USPC ............ 229/117.14, 120.17, 117.15, 117.24; 206/169, 180
See application file for complete search history.

(56) References Cited

U.S. PATENT DOCUMENTS

| | | |
|---|---|---|
| 6,056,119 A | 5/2000 | Risgalla et al. |
| 6,334,537 B1 | 1/2002 | Tepper |
| 7,070,145 B2 | 7/2006 | Baldwin |
| 8,358,967 B1 | 1/2013 | Rebolledo et al. |
| 8,876,057 B2 | 11/2014 | Alber et al. |
| 8,960,436 B1 | 2/2015 | Smith |
| 8,991,793 B1 | 3/2015 | Bernhardt |
| 2010/0316461 A1 | 12/2010 | Huchler |
| 2011/0284417 A1 | 11/2011 | Duong |
| 2015/0120094 A1 | 4/2015 | Kimchi et al. |

FOREIGN PATENT DOCUMENTS

WO     2013/123944     8/2013

OTHER PUBLICATIONS

Hern, Alex, "DHL launches first commercial drone 'parcelcopter' delivery service," The Guardian, Sep. 25, 2014, 2 pages, http://www.theguardian.com/technology/2014/sep/25/german-dhl-launches-first-commerci . . . .

*Primary Examiner* — Christopher Demeree
(74) *Attorney, Agent, or Firm* — McDonnell Boehnen Hulbert & Berghoff LLP

(57) ABSTRACT

A package enclosure for use on an aerial vehicle including an outer skin having left and right side walls and a front end and a rear end, a base positioned within the outer skin exerting a force against inner surfaces of the left and right side walls of the outer skin, and a handle upwardly extending from the base.

26 Claims, 27 Drawing Sheets

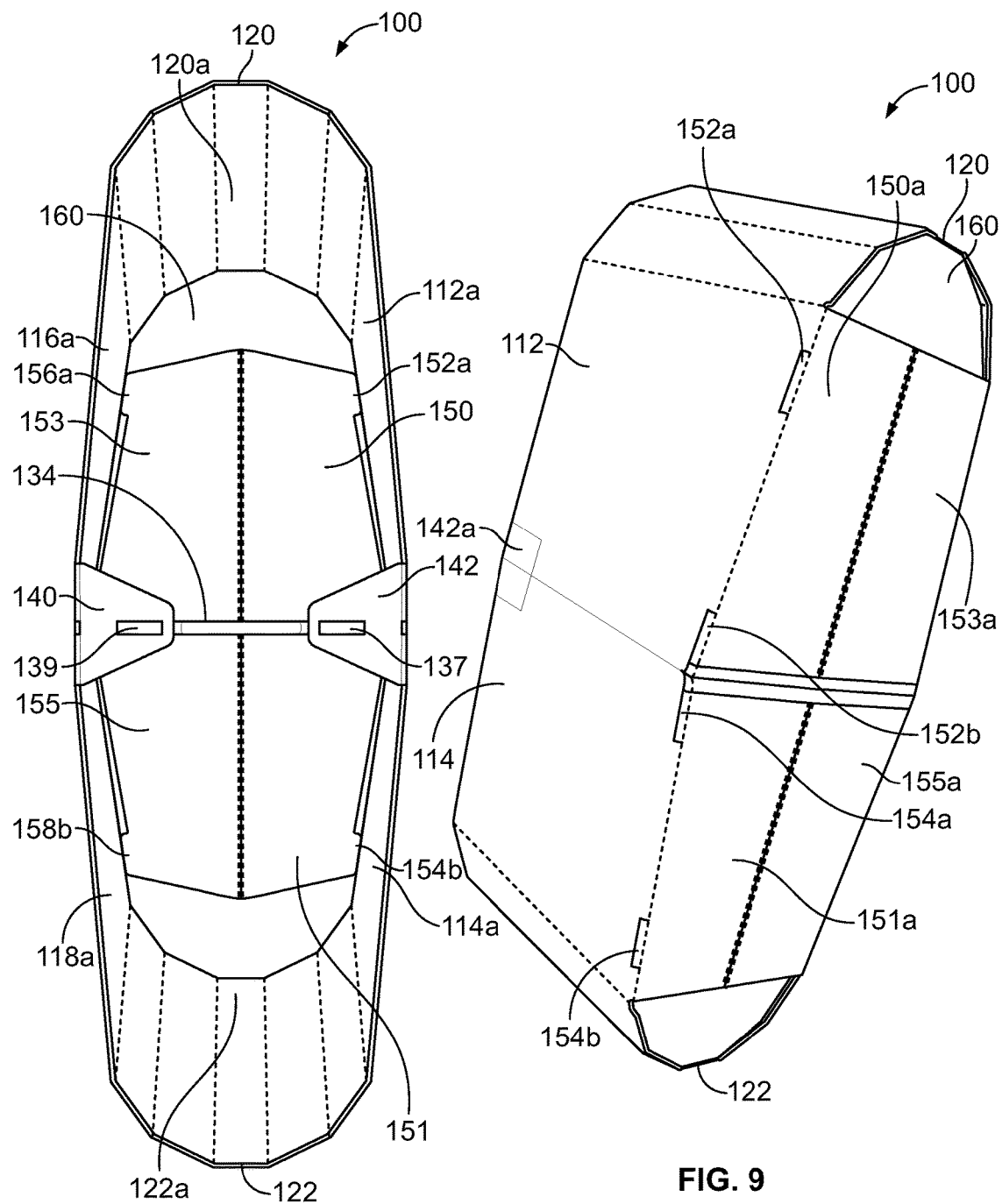

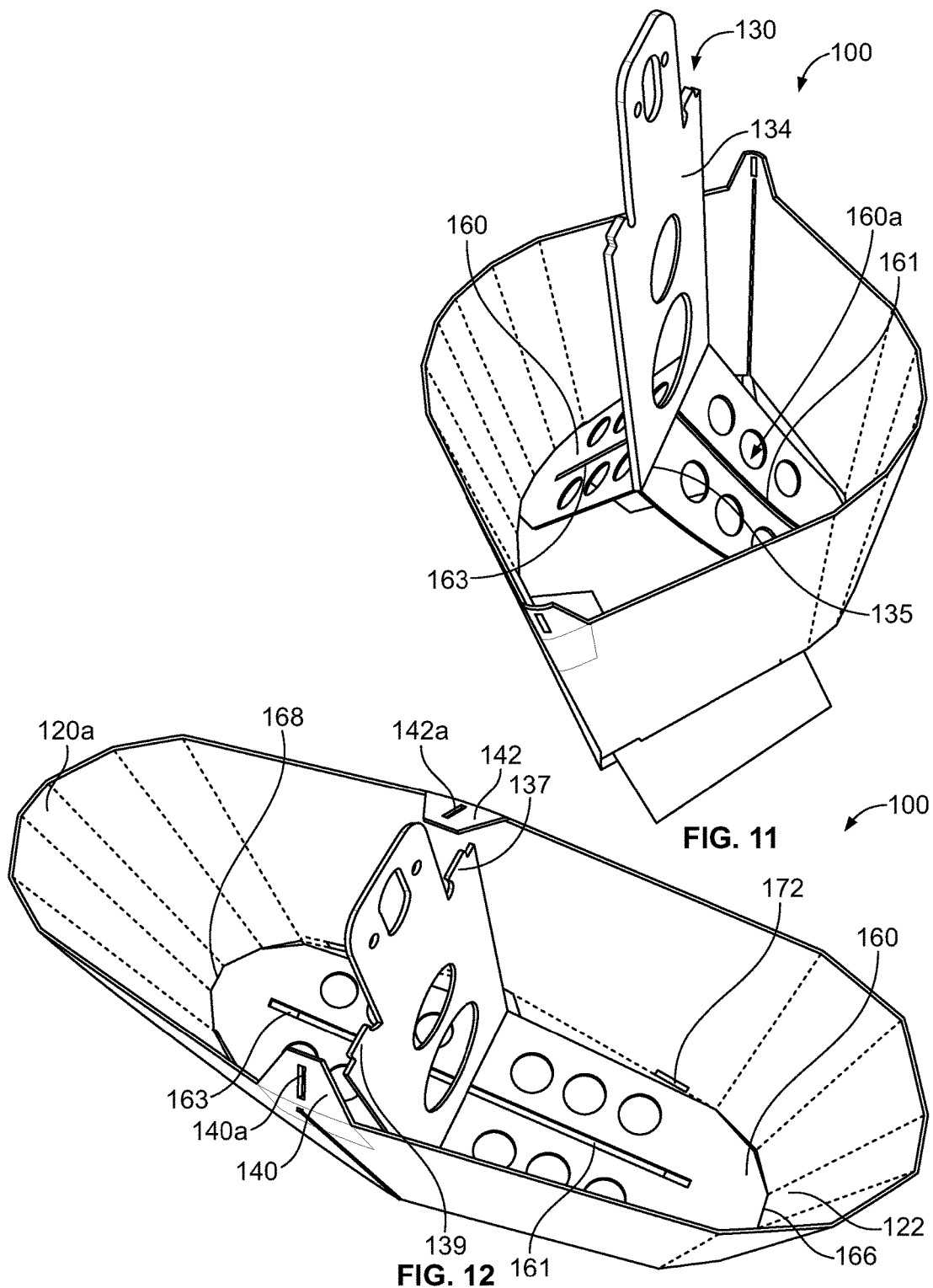

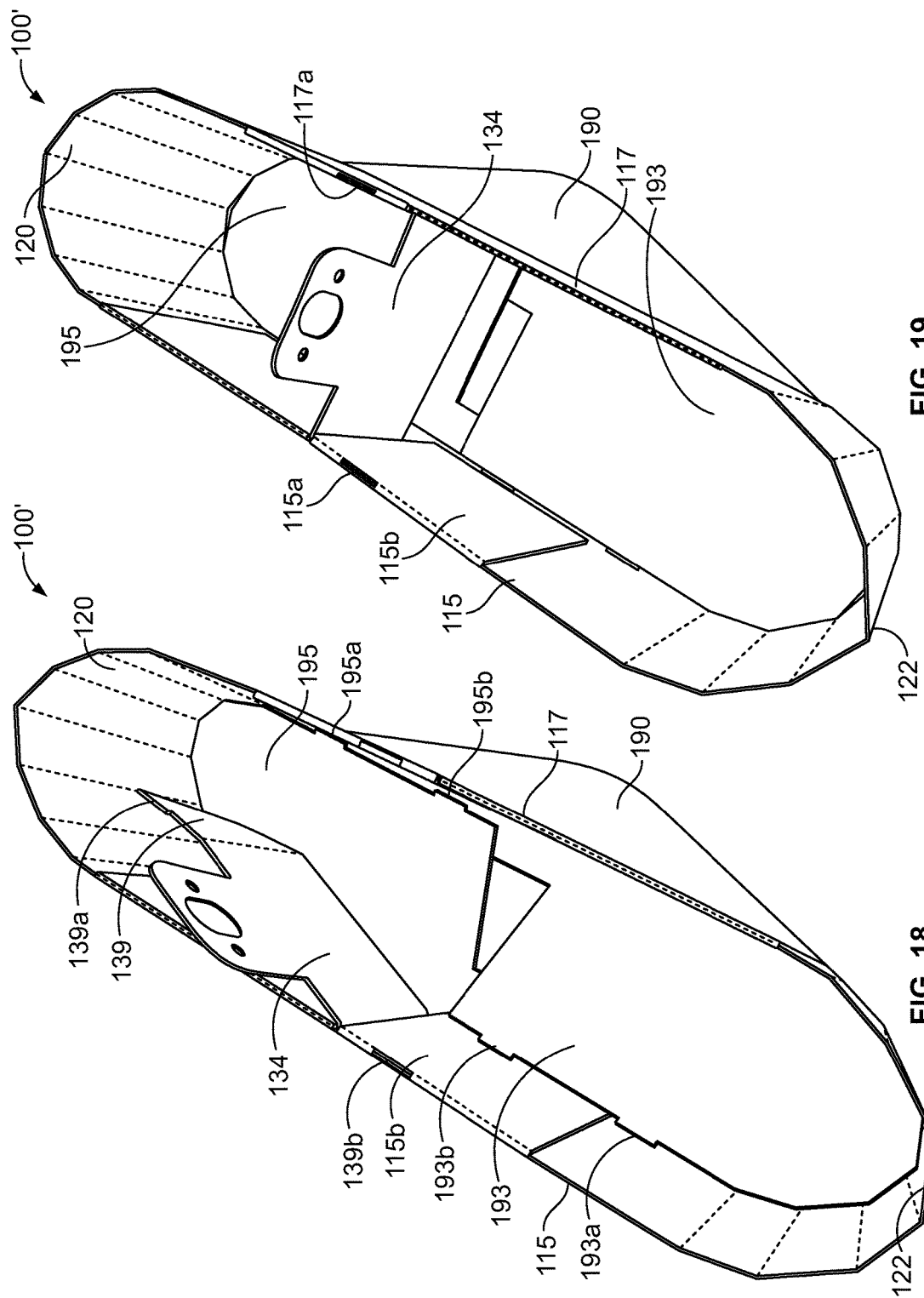

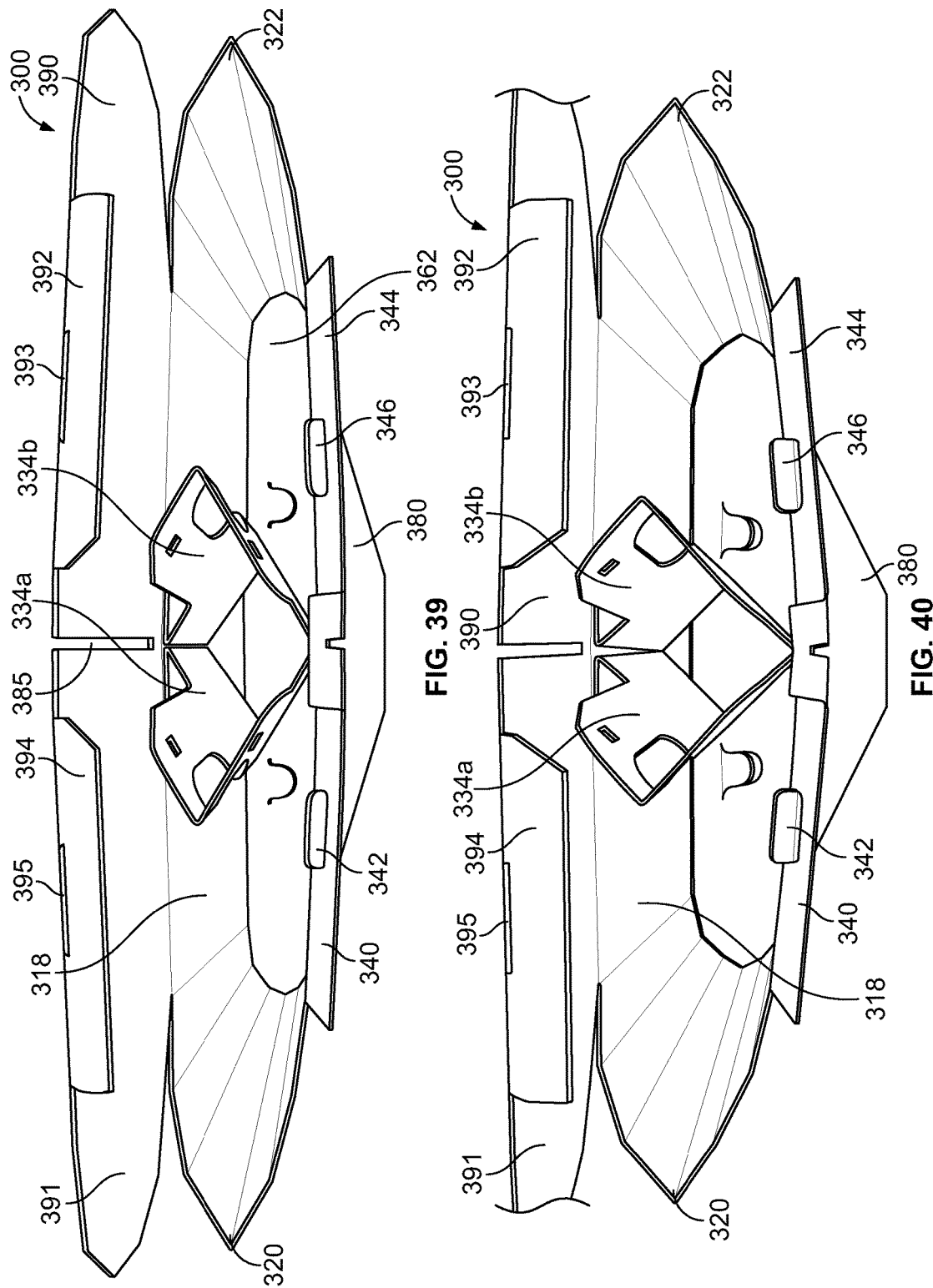

PACKAGE FOR DRONE DELIVERY

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter Unmanned Aerial Vehicles "UAVs", among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

UAVs may be used to carry a load to be delivered. When a payload is carried outside of the aircraft or UAV, there are a series of packaging challenges that need to be addressed. The package creates aerodynamic drag on the system. The outer mold line of the package needs to be carefully formed to minimize its aerodynamic impact. A traditional rectangular box creates an undesirable amount of drag.

Furthermore, the package enclosure needs to protect its contents from the environment (temperature, moisture, dirt, insects, impact, etc.). A package enclosure on the outside of an aircraft or UAV is subjected to a huge range of environmental conditions. The package enclosure needs to be durable enough to safely contain its cargo. Also, the package enclosure should protect the package contents from convection cooling/heating (air blowing through package).

The package enclosure also requires a firm attachment point to the aircraft or UAV. A package mounted to the exterior of an aircraft affects the flight dynamics of the system and needs to be rigidly mounted so that it does not shift in flight.

In addition, the package contents need to be held in place inside the package enclosure. Shifting contents will affect the aircraft's balance which will affect its flight dynamics.

SUMMARY

The present embodiments are directed to an aerodynamic package enclosure that may be secured underneath an aerial vehicle which may be used to deliver a package contained within the package enclosure. Using these embodiments of a package enclosure allows the aircraft/package system to have an optimal exterior form for aerodynamic efficiency (which reduces energy needed to power the aircraft) while simultaneously allowing the packaging to be lightweight, and extremely minimal for both merchant storage and end user disposal.

The new package enclosure is basically designed like a wing with one or more ribs and an outer skin. The inner ribs put tension on the outer skin, creating a very stiff and lightweight structure. The oval shape of the package reduces drag and unused volume (especially when loaded with drinking cups). The embodiments are optimized for aerodynamics and may have a coefficient of drag of 0.35 or less, and in some embodiments 0.28 or less, far superior to "boxy" package enclosure designs. The design may make use of an "over center" kinematic to apply tension to the outer skin. The package can be folded completely flat and everything clicks in place very easily. The package also has a very pleasant appearance and includes a handle for attachment to a drone or UAV. The handle is also useful to make the package enclosure available to be used as a handheld carrying bag after delivery. The package enclosure has similarities to an air foil when positioned beneath the UAV.

In one aspect, a package enclosure for use on an aerial vehicle is provided, including an outer skin having left and right side walls and a front end and a rear end, a base positioned within the outer skin exerting a force against inner surfaces of the left and right side walls of the outer skin; and a handle upwardly extending from the base.

In another aspect, a method of constructing a package enclosure is provided, comprising the steps of (i) providing an outer skin with right and left side walls, front and rear end walls, a base, and a handle, wherein the base comprises first and second base sections secured to the handle, and the first base section include a first tab extending from a front end of the first base section, and the second base section includes a second tab extending from the second base section; (ii) inserting the first tab into a slot in the front end of the outer skin; (iii) inserting the second tab into a slot in the rear end of the outer skin; and (iv) pushing down on the handle to move the first and second base sections into a horizontal position while drawing in the right and left side walls into contact with the first and second base sections.

In a further aspect, a method of constructing a package enclosure is provided, comprising the steps of: (i) providing an outer skin with right and left side walls, front and rear end walls, a base, and a handle having a transverse section, wherein the base is attached to a bottom of one of the left and right side walls and includes a plurality of tabs extending from a free end thereof; and (ii) moving the base into a horizontal position and extending the tabs into slots of the left or right side wall to which the base is not attached.

In yet another aspect, a package enclosure for use on an aerial vehicle is provided, including an outer skin having first and second side walls and a first and second end walls, a base positioned within the outer skin, and a handle upwardly extending between the first and second side walls, wherein the base includes a first base section and a second base section and the handle includes a first handle section and a second handle section, wherein the first handle section is contiguous with a first portion of the first side wall, the first portion of the first side wall is contiguous with the first end wall, the first end wall is contiguous to the second side wall, the second side wall is contiguous with the second end wall, the second end wall is contiguous with a second portion of the first side wall, the second portion of the first side wall is contiguous with a second handle section, and the second side wall is contiguous with the first and second base sections.

In another aspect, a method of constructing a package enclosure is provided including the steps of: (i) providing an outer skin with first and second side walls, first and second end walls, a base, and a handle, wherein the base includes a first base section and a second base section and the handle includes a first handle section and a second handle section, wherein the first handle section is contiguous with a first portion of the first side wall, the first portion of the first side wall is contiguous with the first end wall, the first end wall is contiguous to the second side wall, the second side wall is contiguous with the second end wall, the second end wall is contiguous with a second portion of the first side wall, the second portion of the first side wall is contiguous with a second handle section, and the second side wall is contiguous with the first and second base sections; (ii) folding the first base section over the second base section; (iii) folding a first handle extension over the first handle section; (iv) folding a second handle extension over the second handle section; (v) folding the first handle section over itself; (vi) folding the second handle section over itself; (vii) folding the first end wall over itself; (viii) folding the second end wall over itself; and (ix) separating the first and second portions of the first side wall from the second side wall until the first and second handle sections are unfolded and in abutting contact with each other.

These as well as other aspects, advantages, and alternatives, will become apparent to those of ordinary skill in the art by reading the following detailed description, with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 8 is a top view of package enclosure 100 shown in FIG. 7.

FIG. 9 is a perspective bottom view of package enclosure 100 shown in FIGS. 7 and 8.

FIG. 11 is a perspective view of package enclosure 100 shown in FIGS. 7-10 at a first stage of construction.

FIG. 12 is a perspective view of package enclosure 100 shown in FIGS. 7-11 at a second stage of construction.

FIG. 18 is a perspective top view of package enclosure 100' shown in FIG. 17 at a first stage of construction.

FIG. 19 is a perspective top view of package enclosure 100' shown in FIGS. 17 and 18 at a second stage of construction.

FIG. 39 is a top view showing another step in the construction of the package enclosure 300 shown in FIGS. 29-38.

FIG. 40 is a top view showing another step in the construction of the package enclosure 300 shown in FIGS. 29-39.

DETAILED DESCRIPTION

Figure 1A:
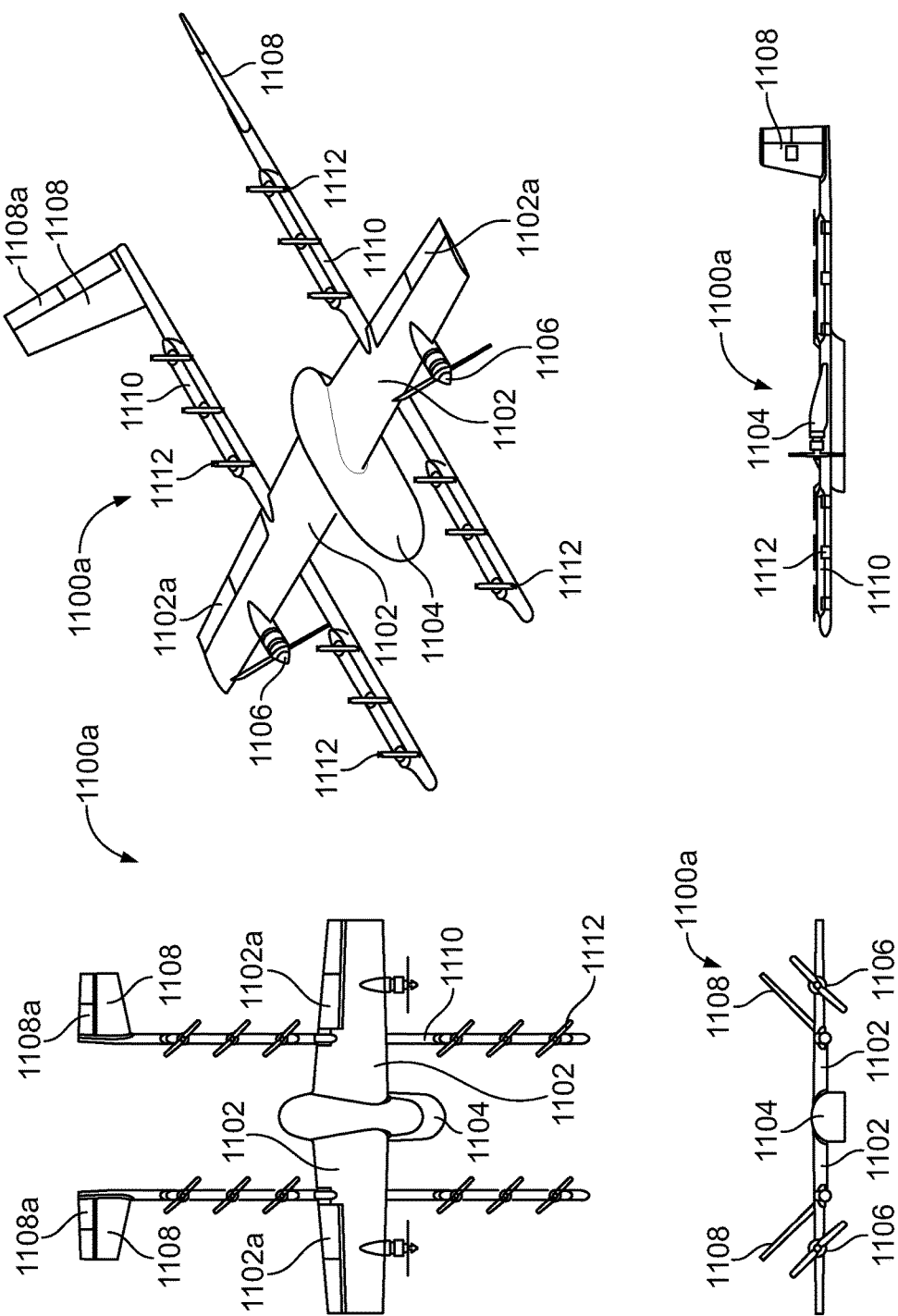
FIGS. 1A, 1B, 2, 3A, and 3B are simplified illustrations of unmanned aerial vehicles, according to example embodiments.

The following detailed description describes various features and functions of the disclosure with reference to the accompanying Figures. In the Figures, similar symbols typically identify similar components, unless context dictates otherwise. The illustrative systems described herein are not meant to be limiting. It will be readily understood that certain aspects of the disclosure can be arranged and combined in a wide variety of different configurations, all of which are contemplated herein.

I. Overview

Example embodiments take the form of or relate to a graphical user interface (GUI) for a UAV transport application, and/or to the service-provider systems that interface with such a transport-service application and coordinate deliveries of items requested via such an application. In an example embodiment, the user-facing application (also referred to as a client-device application) may provide access to UAV food transport service via an application running on a user's device; e.g., via an application running on a mobile phone, wearable device, tablet, or personal computer. However, the examples described herein may apply equally to UAV delivery of other types of items. Further, the UAV delivery service may employ UAVs that carry items from a source location (e.g., a restaurant or store) to a target location indicated by the user. The UAVs may be configured to lower items to the ground at the delivery location via a tether attached to the package containing the items.

An example GUI may include features and functions to enhance the delivery experience for the user once an order is placed, by tracking the delivery process and providing updates and functionality corresponding to different phases of the process. In particular, the GUI may provide real-time updates corresponding to two distinct phases of the delivery process (and perhaps sub-phases thereof), and interactive features corresponding to these phases. Further, a backend support system may periodically or continuously update time of arrival estimates for an order, and provide frequent or real-time updates via the GUI. Advantageously, a service-provider system may take advantage of various factors, many of which are unique to autonomous UAV delivery, to provide highly accurate time of arrival estimates (e.g., +/−1 minute). As such, the UAV delivery application may provide an improved user experience, as compared to typical (e.g., car or bicycle) food delivery services.

In operation the package enclosure to be delivered is secured to the UAV and the UAV is then flown to the desired delivery site. The package enclosure may be secured beneath the UAV, or even positioned partially within the UAV, as the UAV flies to the delivery site. Once the UAV arrives at the delivery site, the UAV is operated in a hover mode and the package enclosure is lowered from the UAV towards the delivery site. During the flight to the delivery site, the package enclosure should be secured beneath the UAV. During the flight to the delivery site, the UAV transports the package enclosure outside of the fuselage which keeps the airframe of the UAV smaller and more economical compared to the size of the UAV required if the package enclosure were positioned within the UAV, and reduces drag of the UAV for the return flight after delivery. When a package enclosure is carried outside of the aircraft or UAV, there are a series of packaging challenges that need to be addressed. The package enclosure creates aerodynamic drag on the system. The outer mold line of the package enclosure needs to be carefully formed to minimize its aerodynamic impact. A traditional rectangular box creates an undesirable amount of drag.

The package enclosure also requires a firm attachment point to the aircraft or UAV. A package enclosure mounted to the exterior of an aircraft affects the flight dynamics of the system and needs to be rigidly mounted so that it does not shift in flight and create undesirable flight characteristics. In addition, the package contents need to be held in place inside the package enclosure. Shifting contents will affect the aircraft's balance which will affect its flight dynamics.

It is desirable that the package enclosure is lightweight, sturdy, weather resistant, and have minimal aerodynamic drag. It is also desirable to construct a package enclosure that uses a minimum amount of materials to construct, to reduce undesirable weight from the package enclosure. Furthermore, it is desirable to construct a package enclosure that can be constructed from materials that lay flat prior to construction. This allows for the transportation of a large number of unconstructed package enclosures in a limited space, as the construction materials lay flat prior to construction, and also provides for improved merchant storage and end user disposal.

The present application provides a package enclosure that allows the aircraft/package system to have an optimal exterior form for aerodynamic efficiency (which reduces energy needed to power the aircraft) while simultaneously allowing the packaging to be lightweight, and extremely minimal for both merchant storage and end user disposal.

The new package enclosure is basically designed like a wing with one or more ribs and an outer skin. The inner ribs put tension on the outer skin, creating a very stiff and lightweight structure. The oval shape of the package reduces drag and unused volume (especially when loaded with drinking cups). The embodiments are optimized for aerodynamics and may have a coefficient of drag of 0.35 or less, and in some cases 0.28 or less, far superior to "boxy" package enclosure designs. The upper surface of the package enclosure may be designed to conform to a lower surface of a UAV to provide a smooth aerodynamic profile. The package enclosure is optimized for aerodynamics while being 0/180 degree symmetric. The embodiments may make use of an 'over center' kinematic to apply tension to the outer skin. The package enclosure can be folded completely flat prior to construction, and all of the components click into place very easily. The package enclosure also has a very pleasant appearance and includes a handle for secure attachment to a drone or UAV. The handle is also useful to make the package enclosure available to be used as a handheld carrying bag after delivery.

II. Illustrative Unmanned Vehicles

Herein, the terms "unmanned aerial vehicle" and "UAV" refer to any autonomous or semi-autonomous vehicle that is capable of performing some functions without a physically-present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is a simplified illustration providing various views of a UAV, according to an example embodiment. In particular, FIG. 1A shows an example of a fixed-wing UAV 1100a, which may also be referred to as an airplane, an aeroplane, a biplane, a glider, or a plane, among other possibilities. The fixed-wing UAV 1100a, as the name implies, has stationary wings 1102 that generate lift based on the wing shape and the vehicle's forward airspeed. For instance, the two wings 1102 may have an airfoil-shaped cross section to produce an aerodynamic force on the UAV 1100a.

As depicted, the fixed-wing UAV 1100a may include a wing body or fuselage 1104. The wing body 1104 may contain, for example, control electronics such as an inertial measurement unit (IMU) and/or an electronic speed controller, batteries, other sensors, and/or a payload, among other possibilities. The illustrative UAV 1100a may also include landing gear (not shown) to assist with controlled take-offs and landings. In other embodiments, other types of UAVs without landing gear are also possible.

The UAV 1100a further includes propulsion units 1106 positioned on the wings 1106 (or fuselage), which can each include a motor, shaft, and propeller, for propelling the UAV 1100a. Stabilizers 1108 (or fins) may also be attached to the UAV 1110a to stabilize the UAV's yaw (turn left or right) during flight. In some embodiments, the UAV 1100a may be also be configured to function as a glider. To do so, UAV 1100a may power off its motor, propulsion units, etc., and glide for a period of time. In the UAV 1100a, a pair of rotor supports 1110 extend beneath the wings 1106, and a plurality of rotors 1112 are attached rotor supports 1110. Rotors 1110 may be used during a hover mode wherein the UAV 1110a is descending to a delivery location, or ascending following a delivery. In the example UAV 1100a, stabilizers 1108 are shown attached to the rotor supports 1110.

During flight, the UAV 1100a may control the direction and/or speed of its movement by controlling its pitch, roll, yaw, and/or altitude. For example, the stabilizers 1108 may include one or more rudders 1108a for controlling the UAV's yaw, and the wings 1102 may include one or more elevators for controlling the UAV's pitch and/or one or more ailerons 1102a for controlling the UAV's roll. As another example, increasing or decreasing the speed of all the propellers simultaneously can result in the UAV 1100a increasing or decreasing its altitude, respectively.

Figure 1B:
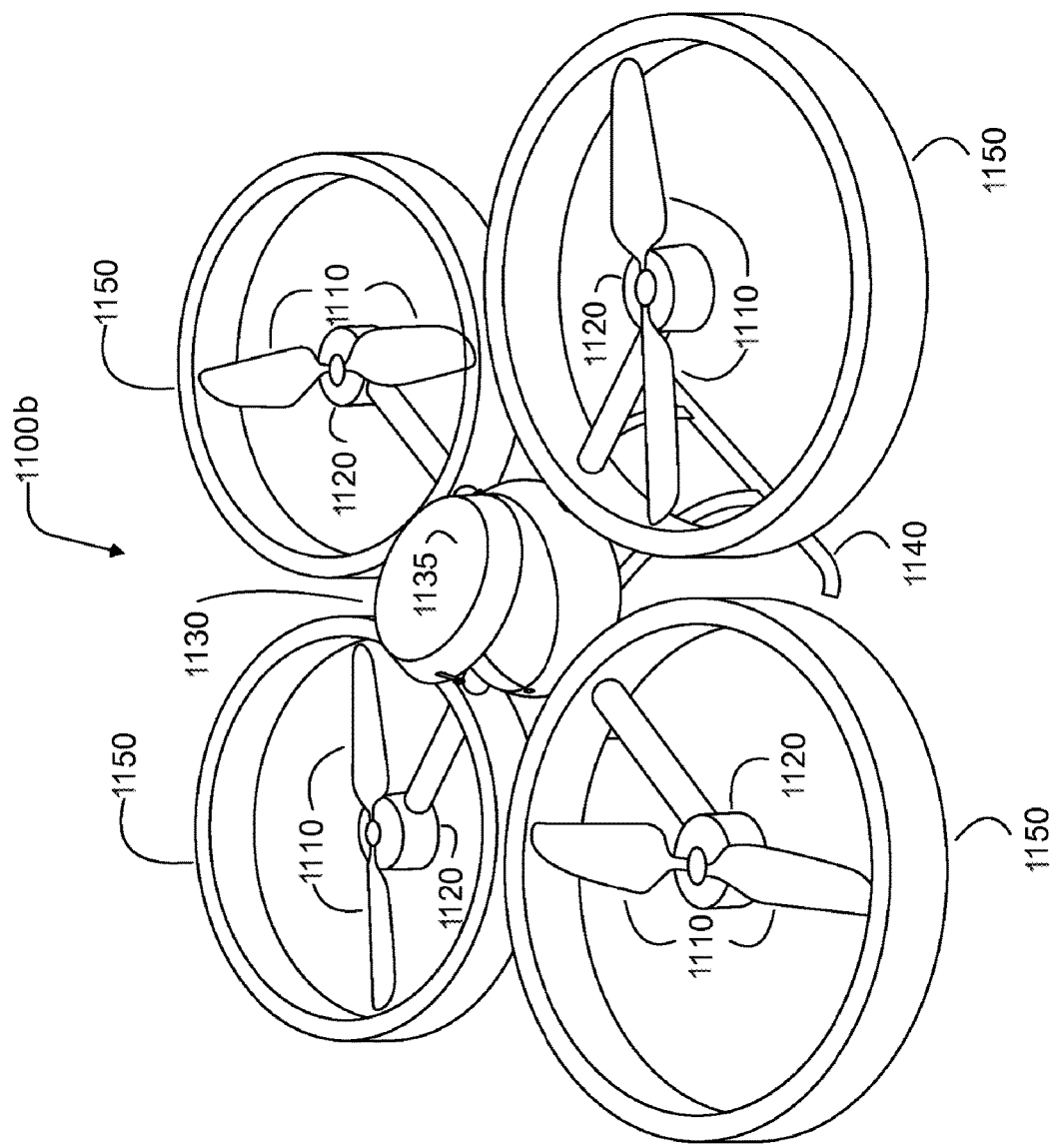

As noted above, some embodiments may involve other types of UAVs, in addition to or in the alternative to fixed-wing UAVs. For instance, FIG. 1B shows an example of a rotorcraft 1100b that is commonly referred to as a multicopter. Multicopter 1100b may also be referred to as a quadcopter, as it includes four rotors 1110. It should be understood that example embodiments may involve rotorcraft with more or fewer rotors than multicopter 1100b. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 1100b in greater detail, the four rotors 1110 provide propulsion and maneuverability for the multicopter 1100b. More specifically, each rotor 1110 includes blades that are attached to a motor 1120. Configured as such the rotors may allow the multicopter 1100b to take off and land vertically, to maneuver in any direction, and/or to hover. Furthermore, the pitch of the blades may be adjusted as a group and/or differentially, and may allow the multicopter 1100b to control its pitch, roll, yaw, and/or altitude.

Multicopter 1100b also includes a central enclosure 1130 with a hinged lid 1135. The central enclosure may contain, e.g., control electronics such as an inertial measurement unit (IMU) and/or an electronic speed controller, batteries, other sensors, and/or a payload, among other possibilities.

The illustrative multicopter 1100b also includes landing gear 1140 to assist with controlled take-offs and landings. In other embodiments, multicopters and other types of UAVs without landing gear are also possible.

In a further aspect, multicopter 1100b includes rotor protectors 1150. Such rotor protectors 1150 can serve multiple purposes, such as protecting the rotors 1110 from damage if the multicopter 1100 strays too close to an object, protecting the multicopter 1100b structure from damage, and protecting nearby objects from being damaged by the rotors 1110. It should be understood that in other embodiments, multicopters and other types of UAVs without rotor protectors are also possible. Further, rotor protectors of different shapes, sizes, and function are possible, without departing from the scope of the invention.

Figure 2:
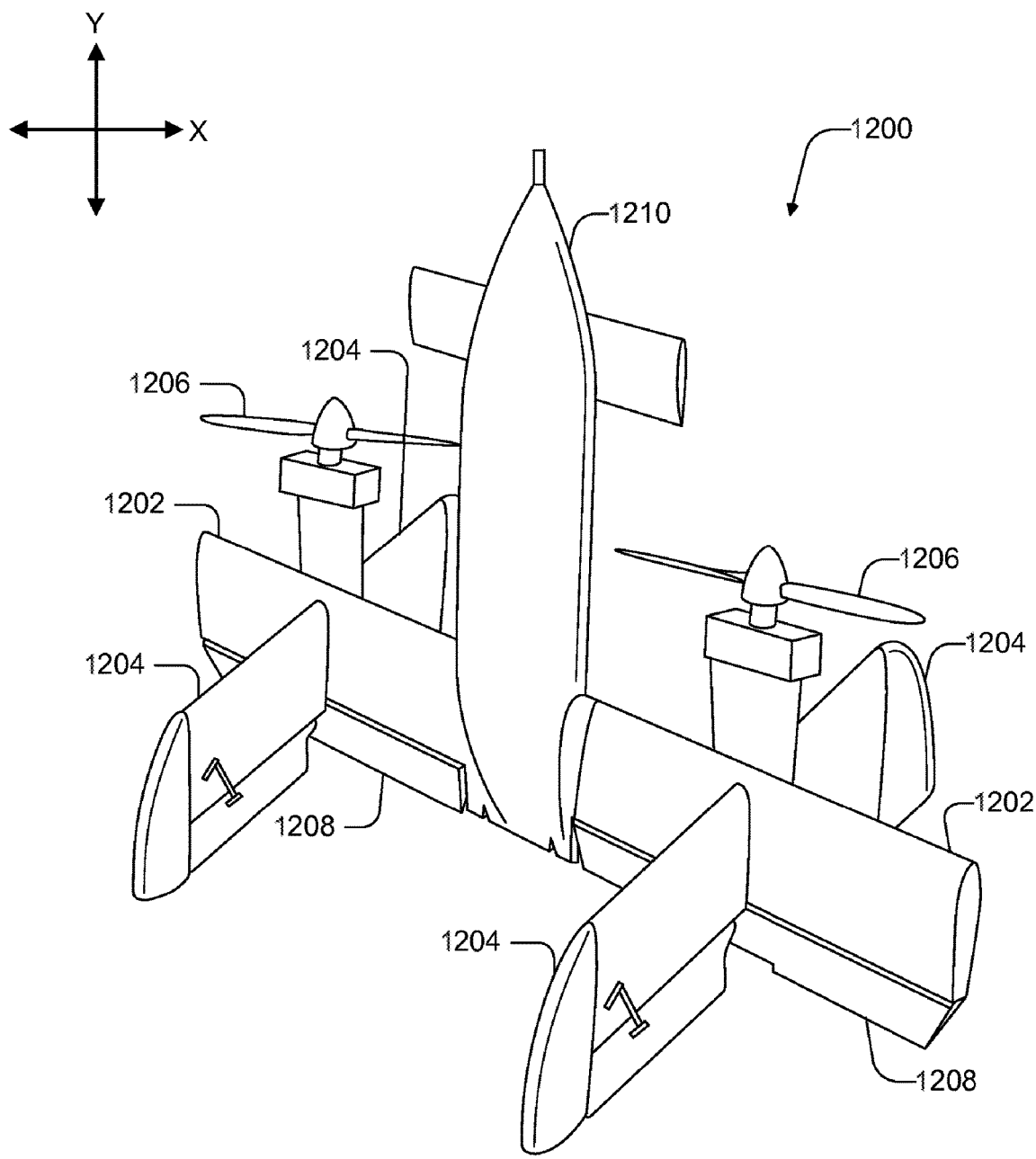

FIG. 2 is a simplified illustration of a UAV, according to an example embodiment. In particular, FIG. 2 shows an example of a tail-sitter UAV 1200. In the illustrated example, the tail-sitter UAV 1200 has fixed wings 1202 to provide lift and allow the UAV to glide horizontally (e.g., along the x-axis, in a position that is approximately perpendicular to the position shown in FIG. 2). However, the fixed wings 1202 also allow the tail-sitter UAV 1200 to take off and land vertically on its own.

For example, at a launch site, tail-sitter UAV 1200 may be positioned vertically (as shown) with fins 1204 and/or wings 1202 resting on the ground and stabilizing the UAV in the vertical position. The tail-sitter UAV 1200 may then take off by operating propellers 1206 to generate the upward thrust (e.g., a thrust that is generally along the y-axis). Once at a suitable altitude, the tail-sitter UAV 1200 may use its flaps 1208 to reorient itself in a horizontal position, such that the fuselage 1210 is closer to being aligned with the x-axis than the y-axis. Positioned horizontally, the propellers 1206 may provide forward thrust so that the tail-sitter UAV 1200 can fly in a similar manner as a typical airplane.

Many variations on the illustrated fixed-wing UAVs are possible. For instance, fixed-wing UAVs may include more or fewer propellers, and/or that utilize a ducted fan or multiple ducted fans. Further, UAVs with more wings (e.g., an "x-wing" configuration with four wings), with fewer wings, or even with no wings, are also possible.

Figure 3A:
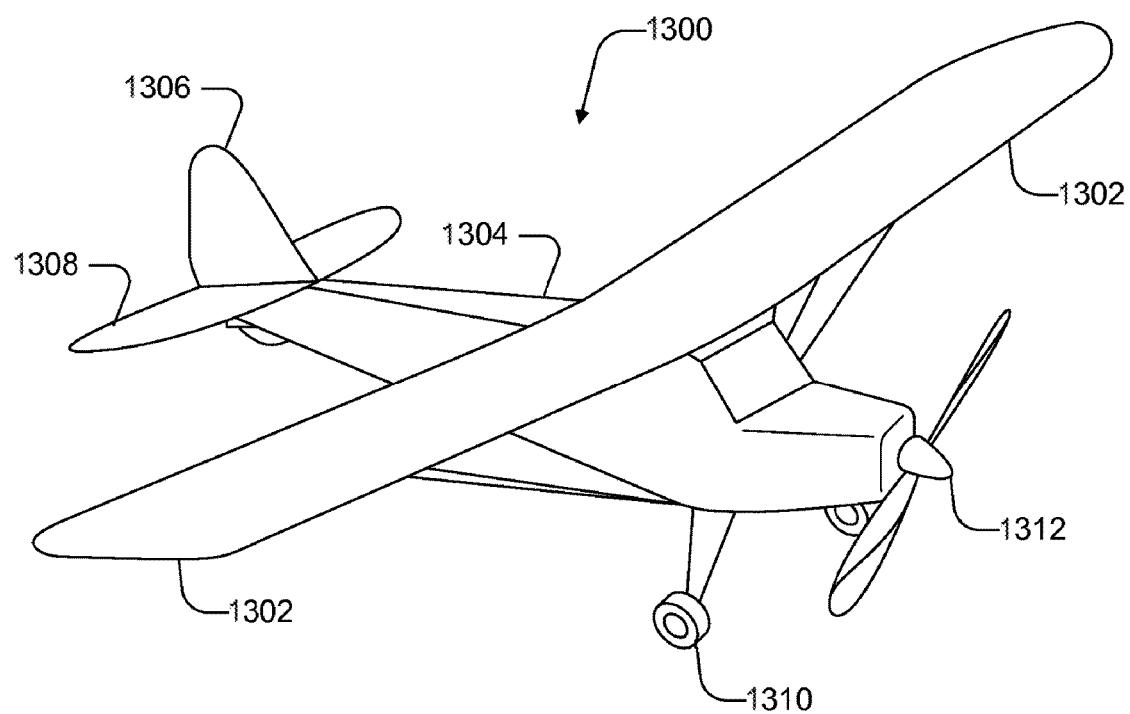

FIG. 3A shows another example of a fixed-wing UAV 1300. The fixed-wing UAV 1300 includes a fuselage 1304, two wings 1302 with an airfoil-shaped cross section to provide lift for the UAV 1300, a vertical stabilizer 1306 (or fin) to stabilize the plane's yaw (turn left or right), a horizontal stabilizer 1308 (also referred to as an elevator or tailplane) to stabilize pitch (tilt up or down), landing gear 1310, and a propulsion unit 1312, which can include a motor, shaft, and propeller.

Figure 3B:
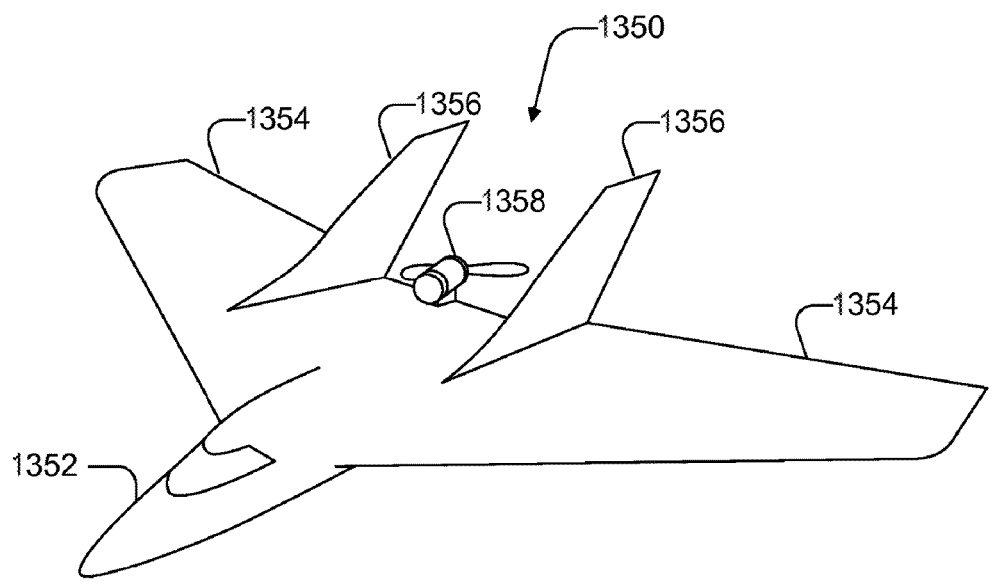

FIG. 3B shows an example of UAV 1350 with a propeller in a pusher configuration. The term "pusher" refers to the fact that the propulsion unit 1358 is mounted at the back of the aircraft and "pushes" the vehicle forward, in contrast to the propulsion unit being mounted at the front of the UAV. Similar to the description provided for FIGS. 1A and 3A, FIG. 3B depicts common structures used in the pusher plane:

a fuselage 1352, two horizontal wings 1354, vertical stabilizers 1356, and a propulsion unit 1358, which can include a motor, shaft, and propeller.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative Uav Deployment Systems

Figure 4:
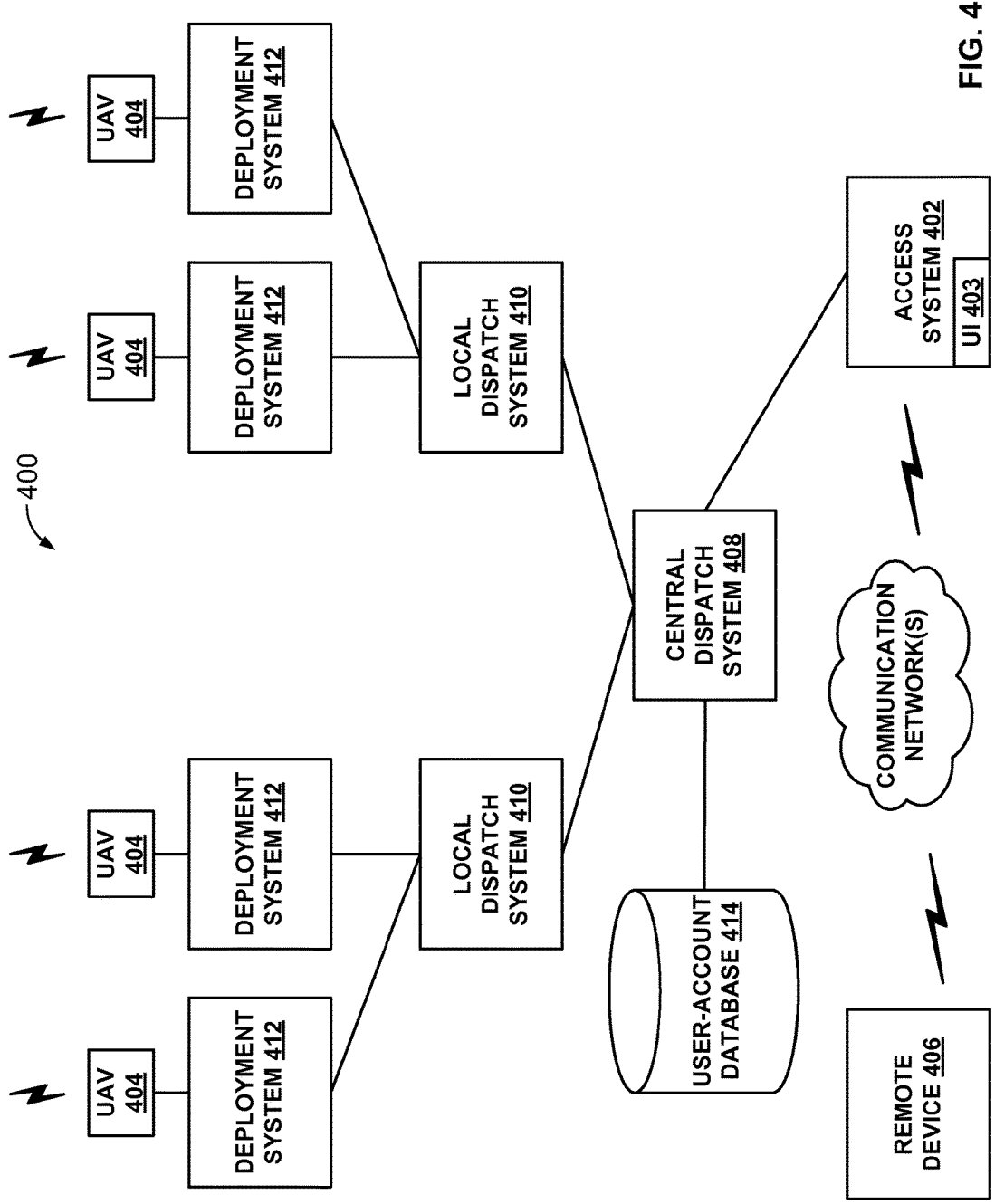
FIG. 4 is a simplified block diagram illustrating a network of unmanned aerial vehicles, according to an example embodiment.

UAV systems may be implemented in order to provide various UAV-related services. In particular, UAVs may be provided at a number of different launch sites, which may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 4 is a simplified block diagram illustrating a distributed UAV system 400, according to an example embodiment.

In the illustrative UAV system 400, an access system 402 may allow for interaction with, control of, and/or utilization of a network of UAVs 404. In some embodiments, an access system 402 may be a computing system that allows for human-controlled dispatch of UAVs 404. As such, the control system may include or otherwise provide a user interface (UI) via which a user can access and/or control UAVs 404.

In some embodiments, dispatch of UAVs 404 may additionally or alternatively be accomplished via one or more automated processes. For instance, the access system 402 may dispatch one of the UAVs 404 to transport a payload to a target location, and the UAV may autonomously navigate to the target location by utilizing various on-board sensors, such as a GPS receiver and/or various navigational sensors. As a specific example, an operator may use an access system 402 to dispatch a UAV 404 to a target location. The UAV 404 may then autonomously navigate to the general area of the target location. At this point, the operator may use the access system 402 to take over control of the UAV 404 and navigate the UAV to the target location (e.g., to a particular person to whom a payload is being transported. Other examples of remote operation of a UAV are also possible.

In an illustrative embodiment, UAVs 404 may take various forms. For example, each UAV 404 may be a UAV such as those illustrated in FIGS. 1A, 1B, 2, 3A, and 3B. However, UAV system 400 may also utilize other types of UAVs without departing from the scope of the invention. In some implementations, all UAVs 404 may be of the same or a similar configuration. However, in other implementations, UAVs 404 may include a number of different types of UAVs. For instance, UAVs 404 may include a number of types of UAVs, with each type of UAV being configured for a different type or types of payload delivery capabilities.

UAV system 400 may further include a remote device 406, which may take various forms. Generally, a remote device 406 may be any device via which a direct or indirect request to dispatch UAV can be made. (Note that an indirect request may involve any communication that may be responded to by dispatching a UAV, such requesting a package delivery). In an example embodiment, the remote device 406 may be a mobile phone, tablet computer, laptop computer, personal computer, or any network-connected computing device. Further, in some instances, remote device 406 may not be a computing device. As an example, a standard telephone, which allows for communication via plain old telephone service (POTS), may serve as a remote device 406. Other types of remote devices are also possible.

In some embodiments, a remote device 406 may be configured to allow a user to request delivery of one or more items to a desired location. For example, a user could request UAV delivery of a package to their home via their mobile phone, tablet, or laptop. As another example, a user could request dynamic delivery to whatever location they are at the time of delivery. To provide such dynamic delivery, a UAV system 400 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 408 may be a server or group of servers, which is configured to receive dispatch messages requests and/or dispatch instructions from an access system 402. Such dispatch messages may request or instruct the central dispatch system 408 to coordinate the deployment of UAVs to various target locations. The central dispatch system 408 may be further configured to route such requests or instructions to local dispatch systems 410. To provide such functionality, central dispatch system 408 may communicate with access system 402 via a data network, such as the Internet or a private network that is established for communications between access systems and automated dispatch systems.

In the illustrated configuration, the central dispatch system 408 may be configured to coordinate the dispatch of UAVs 404 from a number of different local dispatch systems 410. As such, central dispatch system 408 may keep track of which UAVs 404 are located at which local dispatch systems 410, which UAVs 404 are currently available for deployment, and/or which services or operations each of the UAVs 404 is configured for (in the event that a UAV fleet includes multiple types of UAVs configured for different services and/or operations). Additionally or alternatively, each local dispatch system 410 may be configured to track which of its associated UAVs 404 are currently available for deployment and/or are currently in the midst of transport.

In some cases, when central dispatch system 408 receives a request for UAV-related service (e.g., transport of an item) from the access system 402, the central dispatch system 408 may select a specific UAV 404 to dispatch. The central dispatch system 408 may accordingly instruct the local dispatch system 410 that is associated with the selected UAV to dispatch the selected UAV. The local dispatch system 410 may then operate its associated deployment system 412 to launch the selected UAV. In other cases, a central dispatch system 408 may forward a request for a UAV-related service to a local dispatch system 410 that is near the location where the support is requested, and leave the selection of a particular UAV 404 to the local dispatch system 410.

In an example configuration, a local dispatch system 410 may be implemented in a computing system at the same location as the deployment system(s) 412 that it controls. For example, the local dispatch system 410 may be implemented by a computing system installed at a building, such as a warehouse, where the deployment systems 412 and UAVs 404 that are associated with the particular local dispatch system 410 are also located. In other embodiments, the local dispatch system 410 may be implemented at a location that is remote to its associated deployment system(s) 412 and UAVs 404.

Numerous variations on and alternatives to the illustrated configuration of UAV system 400 are possible. For example, in some embodiments, a user of a remote device 406 could request delivery of a package directly from the central dispatch system 408. To do so, an application may be implemented on a remote device 406 that allows the user to provide information regarding a requested delivery, and generate and send a data message to request that the UAV system provide the delivery. In such an embodiment, the central dispatch system 408 may include automated functionality to handle requests that are generated by such an application, evaluate such requests, and, if appropriate, coordinate with an appropriate local dispatch system 410 to deploy a UAV.

Further, some or all of the functionality that is attributed herein to the central dispatch system 408, the local dispatch system(s) 410, the access system 402, and/or the deployment system(s) 412 could be combined in a single system, implemented in a more complex system, and/or redistributed among the central dispatch system 408, the local dispatch system(s) 410, the access system 402, and/or the deployment system(s) 412 in various ways.

Yet further, while each local dispatch system 410 is shown as having two associated deployment systems, a given local dispatch system 410 may have more or fewer associated deployment systems. Similarly, while the central dispatch system 408 is shown as being in communication with two local dispatch systems 410, the central dispatch system may alternately be in communication with more or less local dispatch systems 410.

In a further aspect, a deployment system 412 may take various forms. In general, a deployment system may take the form of or include a system for physically launching a one or more of the UAVs 404. Such a launch system may include features that provide for an automated UAV launch and/or features that allow for a human-assisted UAV launch. Further, the deployment systems 412 may each be configured to launch one particular UAV 404, or to launch multiple UAVs 404.

The deployment systems 412 may further be configured to provide additional functions, including for example, diagnostic-related functions such as verifying system functionality of the UAV, verifying functionality of devices that are housed within a UAV (e.g., payload delivery apparatus, and/or maintaining devices or other items that are housed in the UAV (e.g., by monitoring a status of a payload such as its temperature, weight, etc.

In some embodiments, the deployment systems 412 and their corresponding UAVs 404 (and possibly associated local dispatch systems 410) may be strategically distributed throughout an area such as a city. For example, the deployment systems 412 may be strategically distributed throughout an area such as a city. For example, the deployment systems 412 may be strategically distributed such that each deployment system 412 is proximate to one or more payload pickup locations (e.g., near a restaurant, store, or warehouse). However, deployment systems 412 (and possibly the local dispatch systems 410) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, a UAV system 400 may include or have access to a user-account database 414. The user-account database 414 may include data for a number of user-accounts, and which are each associated with one or more person. For a given user-account, the user-account database 414 may include data related to or useful in providing UAV-related services. Typically, the user data associated with each user-account is optionally provided by an associated user and/or is collected with the associated user's permission.

Further, in some embodiments, a person may have to register for a user account with the UAV system 400, if they wish to be provided with UAV-related services by the UAVs 404 from UAV system 400. As such, the user-account database 414 may include authorization information for a given user-account (e.g., a user-name and password), and/or other information that may be used to authorize access to a user account.

In some embodiments, a person may associate one or more of their devices with their user-account, such that they can access the services of UAV system 400. For example, when a person uses an associated mobile phone to, e.g., place a call to an operator of access system 402 or send a message requesting a UAV-related service to a dispatch system, the phone may be identified via a unique device identification number, and the call or message may then be attributed to the associated user account. Other examples are also possible.

IV. Illustrative Uav Components

Figure 5:
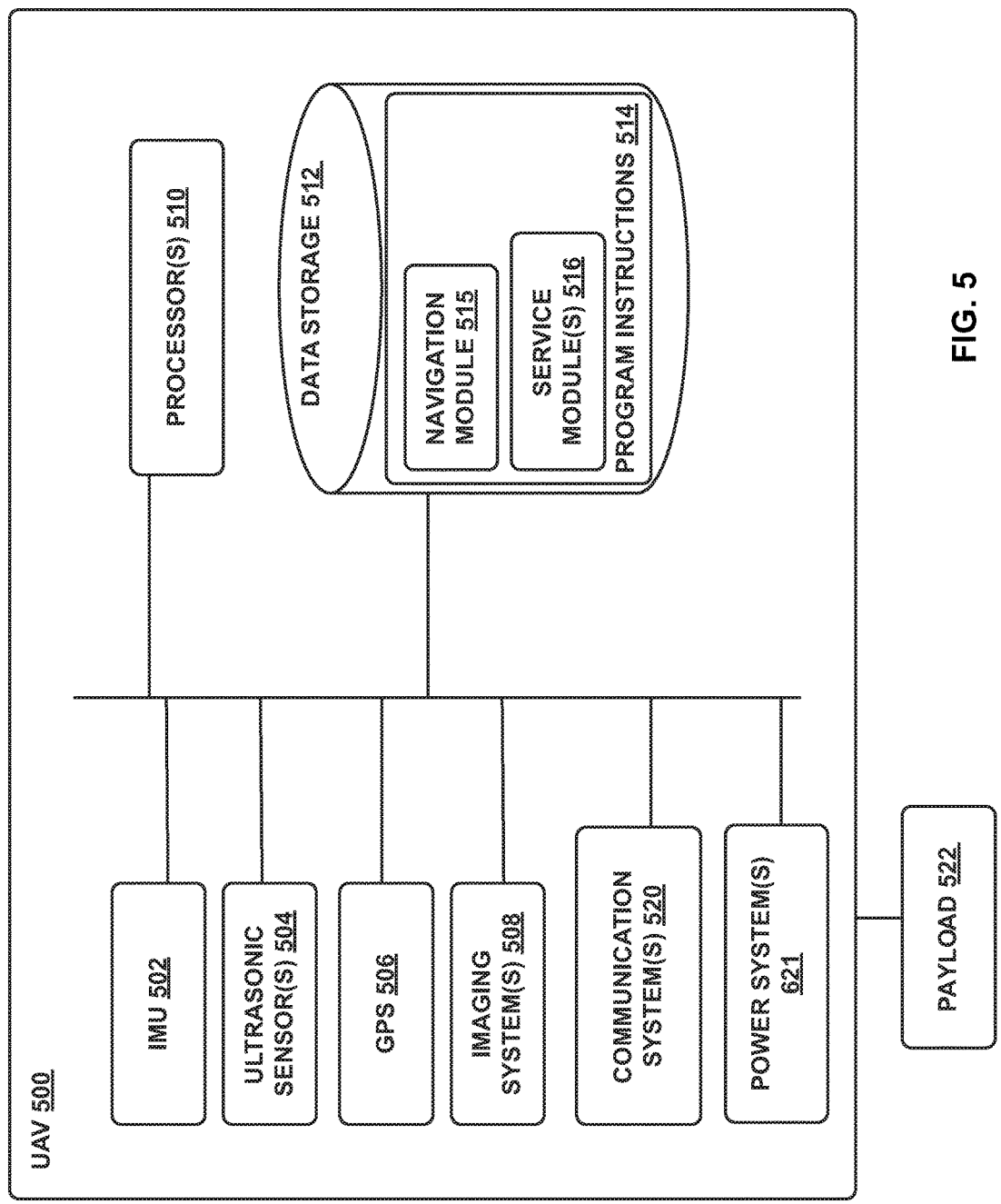
FIG. 5 is a simplified block diagram illustrating components of an unmanned aerial vehicle, according to an example embodiment.

FIG. 5 is a simplified block diagram illustrating components of a UAV 500, according to an example embodiment. UAV 500 may take the form of or be similar in form to one of the UAVs 1100*a*, 1100*b*, 1200, 1300, and 1350 shown in FIGS. 1A, 1B, 2, 3A, and 3B. However, a UAV 500 may also take other forms.

UAV 500 may include various types of sensors, and may include a computing system configured to provide the functionality described herein. In the illustrated embodiment, the sensors of UAV 500 include an inertial measurement unit (IMU) 502, ultrasonic sensor(s) 504, a GPS 506, imaging system(s) 508, among other possible sensors and sensing systems.

In the illustrated embodiment, UAV 500 also includes one or more processors 510. A processor 510 may be a general-purpose processor or a special purpose processor (e.g., digital signal processors, application specific integrated circuits, etc.). The one or more processors 510 can be configured to execute computer-readable program instructions 514 that are stored in the data storage 512 and are executable to provide the functionality of a UAV described herein.

The data storage 512 may include or take the form of one or more computer-readable storage media that can be read or accessed by at least one processor 510. The one or more computer-readable storage media can include volatile and/or non-volatile storage components, such as optical, magnetic, organic or other memory or disc storage, which can be integrated in whole or in part with at least one of the one or more processors 510. In some embodiments, the data storage 512 can be implemented using a single physical device (e.g., one optical, magnetic, organic or other memory or disc storage unit), while in other embodiments, the data storage 512 can be implemented using two or more physical devices.

As noted, the data storage 512 can include computer-readable program instructions 514 and perhaps additional data, such as diagnostic data of the UAV 500. As such, the data storage 514 may include program instructions to perform or facilitate some or all of the UAV functionality described herein. For instance, in the illustrated embodiment, program instructions 514 include a navigation module 515.

A. Sensors

In an illustrative embodiment, IMU 502 may include both an accelerometer and a gyroscope, which may be used together to determine the orientation of the UAV 500. In particular, the accelerometer can measure the orientation of the vehicle with respect to earth, while the gyroscope measures the rate of rotation around an axis. IMUs are commercially available in low-cost, low-power packages. For instance, an IMU 502 may take the form of or include a miniaturized MicroElectroMechanical System (MEMS) or a NanoElectroMechanical System (NEMS). Other types of IMUs may also be utilized.

An IMU 502 may include other sensors, in addition to accelerometers and gyroscopes, which may help to better determine position and/or help to increase autonomy of the UAV 500. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 500 may also include a pressure sensor or barometer, which can be used to determine the altitude of the UAV 500. Alternatively, other sensors, such as sonic altimeters or radar altimeters, can be used to provide an indication of altitude, which may help to improve the accuracy of and/or prevent drift of an IMU.

In a further aspect, UAV 500 may include one or more sensors that allow the UAV to sense objects in the environment. For instance, in the illustrated embodiment, UAV 500 includes ultrasonic sensor(s) 504. Ultrasonic sensor(s) 504 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 500 may also include one or more imaging system(s). For example, one or more still and/or video cameras may be utilized by UAV 500 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e,g., by applying optical flow techniques to images), video feedback, and/or image recognition and processing, among other possibilities.

UAV 500 may also include a GPS receiver 506. The GPS receiver 506 may be configured to provide data that is typical of well-known GPS systems, such as the GPS coordinates of the UAV 500. Such GPS data may be utilized by the UAV 500 for various functions. As such, the UAV may use its GPS receiver 506 to help navigate to the caller's location, as indicated, at least in part, by the GPS coordinates provided by their mobile device. Other examples are also possible.

B. Navigation and Location Determination

The navigation module 515 may provide functionality that allows the UAV 500 to, e.g., move about in its environment and reach a desired location. To do so, the navigation module 515 may control the altitude and/or direction of flight by controlling the mechanical features of the UAV that affect flight (e.g., its rudders(s), elevator(s), aileron(s), and/or the speed of its propeller(s).

In order to navigate the UAV 500 to a target location, a navigation module 515 may implement various navigation techniques, such as map-based navigation and localization-based navigation, for instance. With map-based navigation, the UAV 500 may be provided with a map of its environment, which may then be used to navigate to a particular location on the map. With localization-based navigation, the UAV 500 may be capable of navigating in an unknown environment using localization. Localization-based navigation may involve a UAV 500 building its own map of its environment and calculating its position within the map and/or the position of objects in the environment. For example, as a UAV 500 moves throughout its environment, the UAV 500 may continuously use localization to update its map of the environment. This continuous mapping process may be referred to as simultaneous localization and mapping (SLAM). Other navigation techniques may also be utilized.

In some embodiments, the navigation module 515 may navigate using a technique that relies on waypoints. In particular, waypoints are sets of coordinates that identify points in physical space. For instance, an air-navigation waypoint may be defined by a certain latitude, longitude, and altitude. Accordingly, navigation module 515 may cause UAV 500 to move from waypoint to waypoint, in order to ultimately travel to a final destination (e.g., a final waypoint in a sequence of waypoints).

In a further aspect, navigation module 515 and/or other components and systems of UAV 500 may be configured for "localization" to more precisely navigate to the scene of the target location. More specifically, it may be desirable in certain situations for a UAV to be within a threshold distance of the target location where a payload being delivered by a UAV (e.g., within a few feet of the target destination). To this end, a UAV may use a two-tiered approach in which it uses a more-general location-determination technique to navigate to a target general area that is associated with the target location, and then use a more-refined location-determination technique to identify and/or navigate to the target location within the general area.

For example, a UAV 500 may navigate to the general area of a target destination where a payload is being delivered using waypoints and/or map-based navigation. The UAV may then switch to a mode in which it utilizes a localization process to locate and travel to a more specific location. For instance, if the UAV 500 is to deliver a payload to a user's home, the UAV 500 may need to be substantially close to the target location in order to avoid delivery of the payload to undesired areas (e.g., onto a roof, into a pool, onto a neighbor's property, etc.). However, a GPS signal may only get the UAV 500 so far (e.g., within a block of the user's home) to the stadium. A more precise location-determination technique may then be used to find the specific target location.

Various types of location-determination techniques may be used to accomplish localization of the target delivery location once the UAV 500 has navigated to the general area of the target delivery location. For instance, the UAV 500 may be equipped with one or more sensory systems, such as, for example, ultrasonic sensors 504, infrared sensors (not shown), and/or other sensors, which may provide input that the navigation module 515 utilizes to navigate autonomously or semi-autonomously to the specific target location.

As another example, once the UAV 500 reaches the general area of the target delivery location (or of a moving subject such as a person or their mobile device), the UAV 500 may switch to a "fly-by-wire" mode where it is controlled, at least in part, by a remote operator, who can navigate the UAV 500 to the specific target location. To this end, sensory data from the UAV 500 may be sent to the remote operator to assist them in navigating the UAV 500 to the specific location.

As yet another example, the UAV 500 may include a module that is able to signal to a passer-by for assistance in either reaching the specific target delivery location; for example, a UAV 500 may display a visual message requesting such assistance in a graphic display, play an audio message or tone through speakers to indicate the need for such assistance, among other possibilities. Such a visual or audio message might indicate that assistance is needed in delivering the UAV 500 to a particular person or a particular location, and might provide information to assist the passer-by in delivering the UAV 500 to the person or location (e.g., a description or picture of the person or location, and/or the person or location's name), among other possibilities. Such a feature can be useful in a scenario in which the UAV is unable to use sensory functions or another location-determination technique to determine the specific location. However, this feature is not limited to such scenarios.

In some embodiments, once the UAV 500 arrives at the general area of a target delivery location, the UAV may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., an RF signal, a light signal and/or an audio signal). In this scenario, the UAV 500 may be configured to navigate by "sourcing" such directional signals—in other words, by determining where the signal is strongest and navigating accordingly. As another example, a mobile device can emit a frequency, either in the human range or outside the human range, and the UAV 500 can listen for that frequency and navigate accordingly. As a related example, if the UAV 500 is listening for spoken commands, then the UAV 500 could utilize spoken statements, such as "I'm over here!" to source the specific location of the person requesting delivery of the payload.

In an alternative arrangement, a navigation module may be implemented at a remote computing device, which communicates wirelessly with the UAV 500. The remote computing device may receive data indicating the operational state of the UAV 500, sensor data from the UAV 500 that allows it to assess the environmental conditions being experienced by the UAV 500, and/or location information for the UAV 500. Provided with such information, the remote computing device may determine altitudinal and/or directional adjustments that should be made by the UAV 500 and/or may determine how the UAV 500 should adjust its mechanical features (e.g., its rudder(s), elevator(s), aileron(s), and the speed of its propeller(s)) in order to effectuate such movements. The remote computing system may then communicate such adjustments to the UAV 500 so it can move in the determined manner.

C. Communication Systems

In a further aspect, UAV 500 includes one or more communication systems 520. The communications systems 520 may include one or more wireless interfaces and/or one or more wireline interfaces, which allow UAV 500 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 500 may include communication systems 520 that allow for both short-range communication and long-range communication. For example, the UAV 500 may be configured for short-range communications using Bluetooth and for long-range communications under a CDMA protocol. In such an embodiment, the UAV 500 may be configured to function as a "hot spot;" or in other words, as a gateway or proxy between a remote support device and one or more data networks, such as cellular network and/or the Internet. Configured as such, the UAV 500 may facilitate data communications that the remote support device would otherwise be unable to perform by itself.

For example, UAV 500 may provide a WiFi connection to a remote device, and serve as a proxy or gateway to a cellular service provider's data network, which the UAV might connect to under an LTE or a 3G protocol, for instance. The UAV 500 could also serve as a proxy or gateway to a high-altitude balloon network, a satellite network, or a combination of these networks, among others, which a remote device might not be able to otherwise access.

D. Power Systems

In a further aspect, UAV 500 may include power system(s) 521. The power system 521 may include one or more batteries for providing power to the UAV 500. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

A UAV 500 may employ various systems and configurations in order to transport a payload 522. In some implementations, the payload 522 of a given UAV 500 may include or take the form of a "package" designed to transport various goods to a target delivery location. For example, the UAV 500 can include a compartment, in which an item or items may be transported. Such a package may include one or more food items, purchased goods, medical items, or any other object (s) having a size and weight suitable to be transported between two locations by a UAV. In other embodiments, a payload 522 may simply be the one or more items that are being delivered (e.g., without any package housing the items).

In some embodiments, the payload 522 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 522 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a retractable delivery system that lowers the payload to the ground while the UAV hovers above. For instance, the UAV may include a tether that is coupled to the payload by a release mechanism. A winch can unwind and wind the tether to lower and raise the release mechanism. The release mechanism can be configured to secure the payload while being lowered from the UAV by the tether and release the payload upon reaching ground level. The release mechanism can then be retracted to the UAV by reeling in the tether using the winch.

In some implementations, the payload 522 may be passively released once it is lowered to the ground. For example, a passive release mechanism may include one or more swing arms adapted to retract into and extend from a housing. An extended swing arm may form a hook on which the payload 522 may be attached. Upon lowering the release mechanism and the payload 522 to the ground via a tether, a gravitational force as well as a downward inertial force on the release mechanism may cause the payload 522 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 522 no longer forces the swing arm to extend from the housing. Retracting the swing arm into the housing may reduce the likelihood of the release mechanism snagging the payload 522 or other nearby objects when raising the release mechanism toward the UAV upon delivery of the payload 522.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

V. Systems for Lowering Payload From Hovering Uav to Ground

Figure 6A:
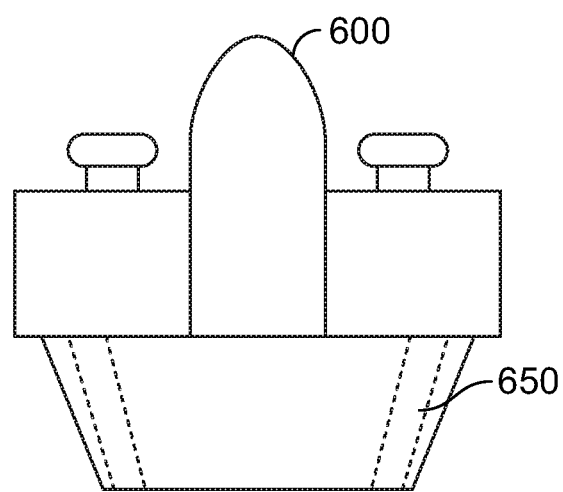
FIGS. 6A and 6B show a UAV that includes a package enclosure 650, according to an example embodiment.
Figure 6B:
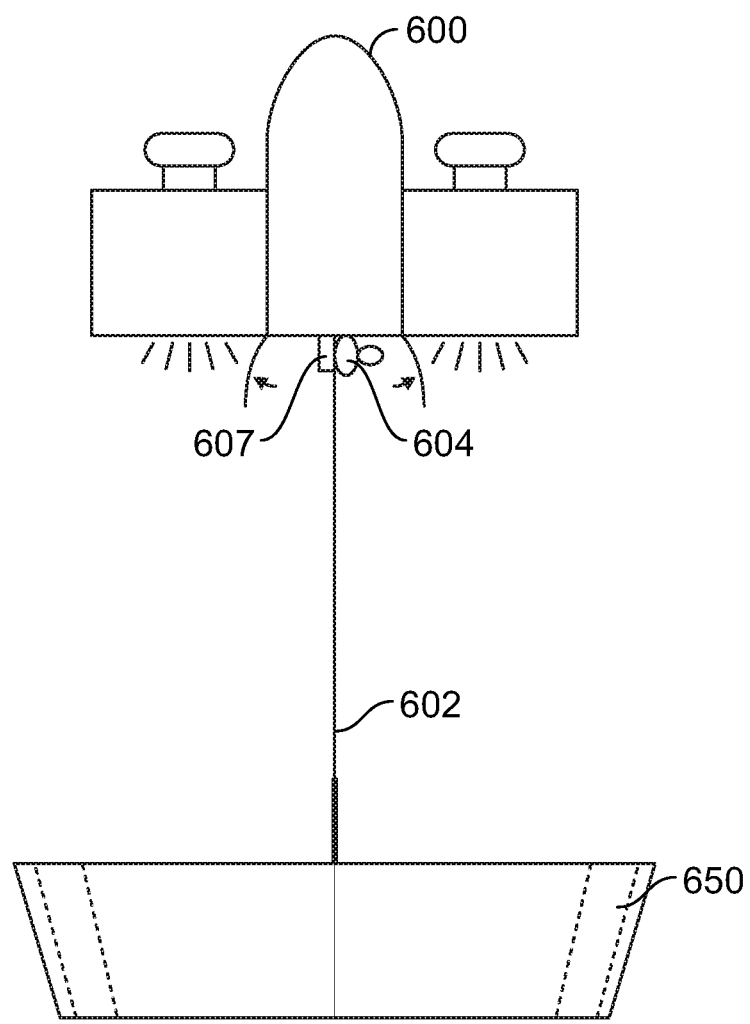

FIGS. 6A and 6B show a UAV 600 that includes a payload delivery system with package enclosure 650 positioned beneath the UAV 600, according to an example embodiment. As shown, payload delivery system for UAV 600 includes a line 602, a line-deployment mechanism 604, a payload-release mechanism, and a package enclosure 650. The package enclosure 650 and its contents may itself be the item to be delivered. Thus, the package enclosure 650 may contain items that are desired to be delivered to the delivery site. In either case, the payload delivery system of UAV 600 may be operable to autonomously lower package enclosure 650 to the ground in a controlled manner.

More specifically, as shown in FIG. 6A, the UAV may be operable to hold the package enclosure 650 against or close to the bottom of the UAV, during flight from a launch site to the delivery location. Then, when the UAV 600 reaches the delivery location, the UAV's control system may operate the line-deployment mechanism 604 such that the package enclosure 650 is lowered to the ground, as shown in FIG. 6B.

The UAV may accordingly include features that can hold the package enclosure 650 in place and/or stabilize the package enclosure 650 during flight. Such features may be moveable such that the line-deployment mechanism can lower the payload upon arriving at the delivery location. For instance, in the configuration shown in FIGS. 6A and 6B, UAV 600 may include moveable brackets that interact with a handle positioned on the package enclosure 650. Brackets may hold package enclosure 650 in place during flight, as shown in FIG. 6A. When UAV 600 reaches the delivery location, brackets may be removed from the handle of package enclosure 650, so that the package enclosure can be lowered towards the ground. Note that other types of mechanisms may also be used to hold the package enclosure in place and/or to stabilize the package enclosure 650 during flight. Alternatively, the package enclosure 650 may simply be held in place during flight by the line 602, without use of any additional features.

In a further aspect, when the control system detects that the payload has been lowered to a point where it is at or near the ground, the control system may responsively operate the payload-release mechanism to detach the package enclosure 650 from the line 602. As such, the UAV's control system may use various types of data, and various techniques, to determine when the package enclosure 650 is at or near the ground. Further, the data that is used to determine when the package enclosure 650 is at or near the ground may be provided by sensors on UAV 600, sensors on the line 602, sensors on the package enclosure 650, and/or other data sources.

A. Line-Deployment Mechanism

In an example embodiment, the line-deployment mechanism may include or take the form of a winch that is configured to deploy a line with a package enclosure 650 attached thereto. The winch may include a motor (e.g., a DC motor) that can be actively controlled by a servomechanism (also referred to as a "servo") and a microcontroller. The microcontroller may output a desired operating rate (e.g., a desired RPM) for the winch, which may correspond to the speed at which the line 602 and package enclosure 650 should be lowered towards the ground. The servo may then control the winch so that it maintains the desired operating rate.

In a further aspect, the line-deployment mechanism 604 may vary the rate at which the line 602 and package enclosure 650 are lowered to the ground. For example, a microcontroller may change the desired operating rate according to a variable deployment-rate profile and/or in response to other factors in order to change the rate at which the package enclosure 650 descends towards the ground. To do so, the line-deployment mechanism 604 may adjust the amount of braking or the amount of friction that is applied to the line 602. For example, to vary the line deployment rate, the line-deployment mechanism 604 may include friction pads that can apply a variable amount of pressure to the line 602. As another example, a line-deployment mechanism 604 can include a motorized braking system that varies the rate at which a wheel lets out the line 602. Such a braking system may take the form of an electromechanical system in which motor operates to slow the rate at which a spool lets out the line. Further, the motor may vary amount by which it adjusts the speed (e.g., the RPM) of the spool, and thus may vary the deployment rate of the line 602. Other examples are also possible.

In some embodiments, the line-deployment mechanism may be attached to the package enclosure 650, instead of being attached to the UAV housing. For example, a winch could be attached to the top of the package enclosure 650. In such an embodiment, the winch may be operable to hold the package enclosure 650 at or near the bottom of the UAV housing during flight to a delivery location. Further, upon arriving at the delivery location, the winch may be operable to lower the package enclosure 650 by releasing the line 602 and/or using a brake to adjust the rate at which the line 602 is released. Further, it is contemplated that other types of line-deployment mechanisms may also be attached to the package enclosure 650.

VII. Example Embodiments of Package Enclosures

Figure 7:
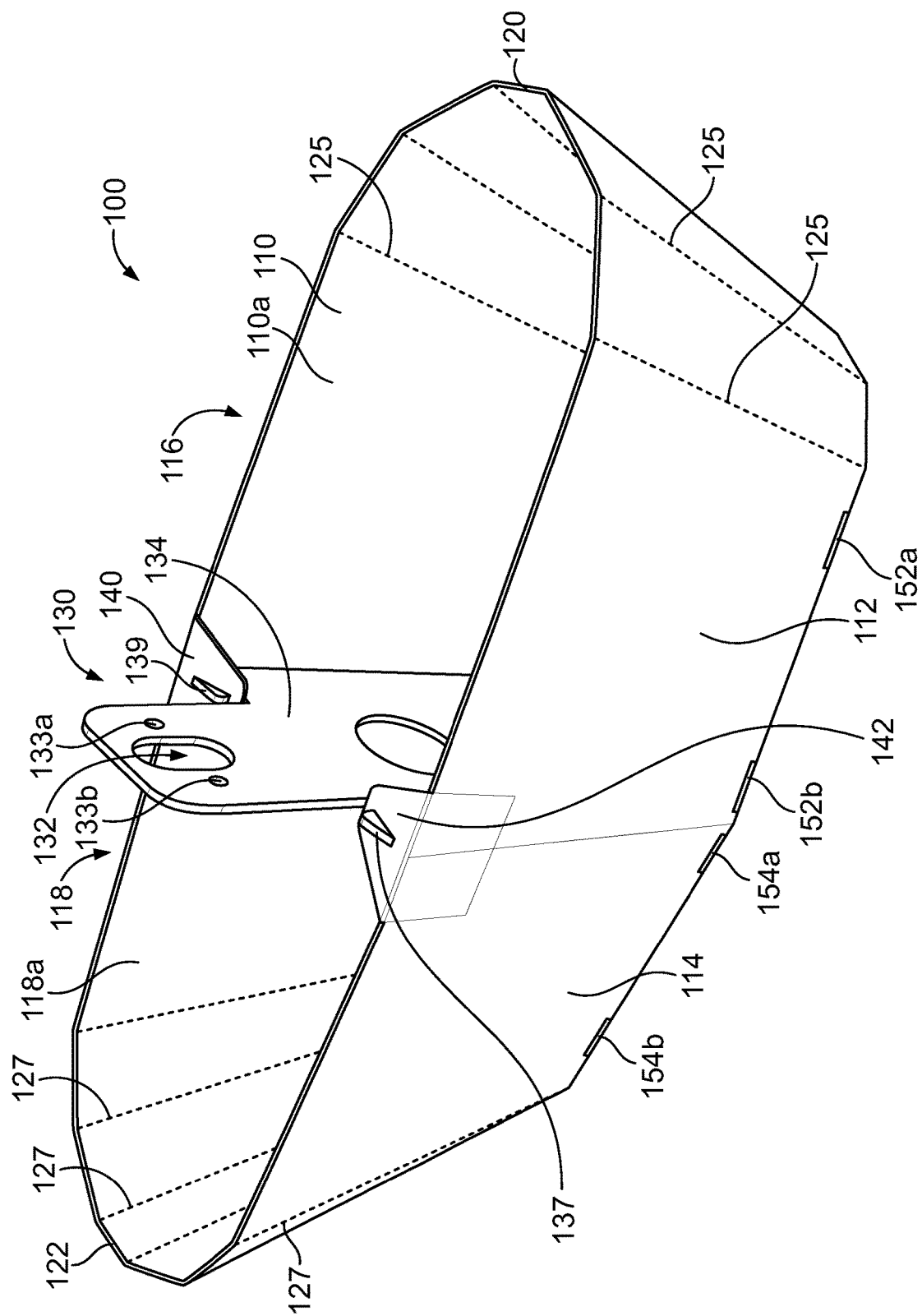
FIG. 7 is a perspective view of package enclosure 100, according to an example embodiment.

FIG. 7 is a perspective view of package enclosure 100, according to an example embodiment. Package enclosure 650 shown in FIGS. 6A and 6B may be configured as package enclosure 100, or as package enclosures 100', 200, and 300 described below. Package enclosure 100 includes an outer skin 110 that includes front end 120 with fold lines 125 and rear end 122 with fold lines 127. Outer skin 110 further includes front right side wall 112, rear right side wall 114, front left side wall 116, and rear left side wall 118. A base positioned within the package enclosure 100 (base shown in FIG. 8) includes tabs 152a and 152b that extend through front right side wall 112 and includes tabs 154a and 154b that extend through rear right side wall 114.

A handle 130 extends transversely between left side walls 116 and 118, and right side walls 112 and 114 of outer skin 110. Handle 130 includes a transverse section 134 that is seated against inner surfaces 110a and 118a of left side walls 110 and 118, as well as inner surfaces of right side walls 112 and 114 thereby providing structure to the outer skin 110. Transverse section 134 includes an aperture 132 that may be used to secure the package enclosure to a UAV, and also serves a carrying handle for an end user following delivery. Further apertures 133a and 133b are also positioned on transverse section 134 which can also be used to secure the package enclosure 100 to a UAV.

A flap 142 extends inwardly from the right side of outer skin 110. An upwardly extending tab 137 positioned on transverse section 134 extends through flap 142. Similarly a flap 140 extends inwardly from the left side of outer skin 100. An upwardly extending tab 139 positioned on transverse section 134 extends through a slot in flap 140. Together flap 142 and tab 137, as well as tab 140 and tab 139, secure the handle 130 in a proper position within the outer skin 110.

FIG. 8 is a top view of package enclosure 100 shown in FIG. 7. Base 160 is attached to the bottom of transverse section 134 of handle 130. Base 160 exerts forces against inner surface 120a of front end 120, inner surface 122a of rear end 122, inner surface 116a of front left side wall 116, inner surface 118a of rear left side wall 118, inner surface 112a of right front side wall 112, and inner surface 114a of right rear side wall 114. In this manner base 160 acts as a rib that provides structural rigidity and support to outer skin 110.

In addition, as can be seen in FIGS. 8 and 9, base 160 is sandwiched between base supports 150 and 150a, base supports 153 and 153a, base supports 151 and 151a, and base supports 155 and 155a. Tabs 152a and 152b of base support 150 extend through side wall 112 of outer skin 110 to maintain base 160 sandwiched between base supports 150 and 150a. Similarly tabs 154a and 154b of base support 151 extend through side wall 114 of outer skin 110 to maintain base 160 sandwiched between base support 151 and 151a. Similar tabs are also positioned on base support 155 that extend through side wall 118 to maintain base 160 sandwiched between base supports 155 and 155a, as well as tabs positioned on base support 153 that extend side wall 116 to maintain base 160 sandwiched between base supports 153 and 153a. Base supports 150, 150a, 151, 151a, 153, 153a, 155, and 155a provide further strength and rigidity to the bottom of package enclosure 100.

It will also be appreciated that transverse section 134 of handle 130 exerts a force against the left and right inner sides of outer skin 110 such that the left and right side walls bow outwardly somewhat, thereby serving to provide additional tension on, and rigidity to, outer skin 110.

Figure 10:
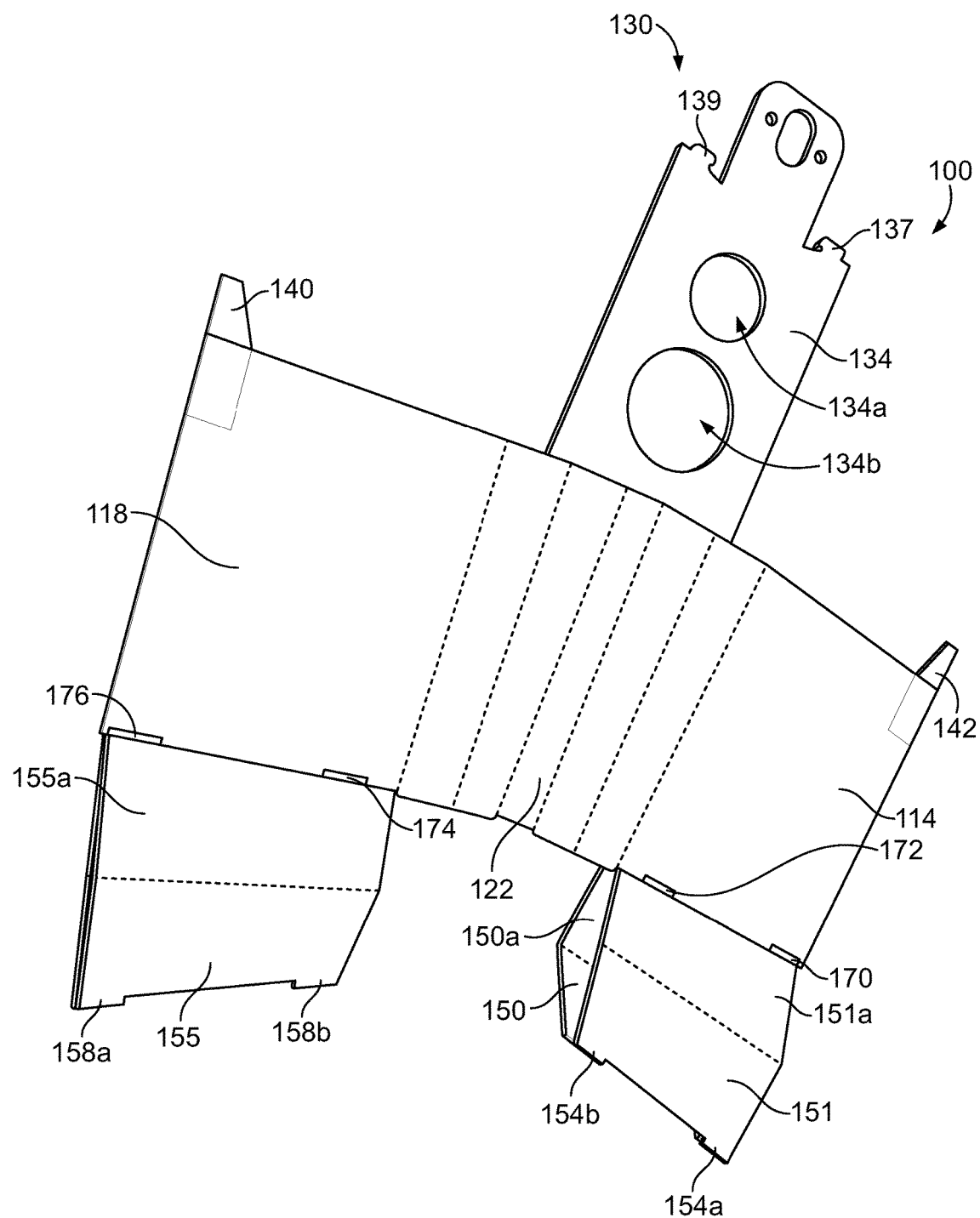
FIG. 10 is a perspective view of package enclosure 100 shown in FIGS. 7-9 prior to construction.

FIG. 10 is a perspective view of package enclosure 100 shown in FIGS. 7-9 prior to construction. As can be seen, the package enclosure lies flat in an unconstructed state. This provides the advantage of reduced storage space required for storage when in an unconstructed state, and reduced space required for transportation when in an unconstructed state. In the unconstructed state shown in FIG. 10, the base is positioned within the outer skin 110 and between the front end 120 and rear end 122 of the outer skin 110. Inner surfaces of right side walls 112 and 114 lie against each other, and inner surfaces of left side walls 116 and 118 lie against each other, when the package enclosure 100 is in the unconstructed state. Handle 130 having transverse section 134 extends upwardly from the side walls. Transverse section 134 of handle 130 includes apertures 134a and 134b that reduce the weight of the handle 130 and provide for increased hoop strength, and also may be used to extend long package content through. Tabs 137 and 139 are shown extending upwardly from transverse section 134 of handle 130.

Base supports 151a and 151 downwardly extend from rear right side wall 114. Base support 151 includes tabs 154a and 154b that when inserted through slot 161 of base 160 (shown in FIG. 12) ultimately extend through slots 170 and 172, respectively, of side wall 114. Similarly, base supports 155a and 155 downwardly extend from rear left side wall 118. Base support 155 includes tabs 158a and 158b that when inserted through slot 163 of base 160 (shown in FIG. 12) ultimately extend through slots 176 and 174, respectively, of side wall 118.

Figure 13:
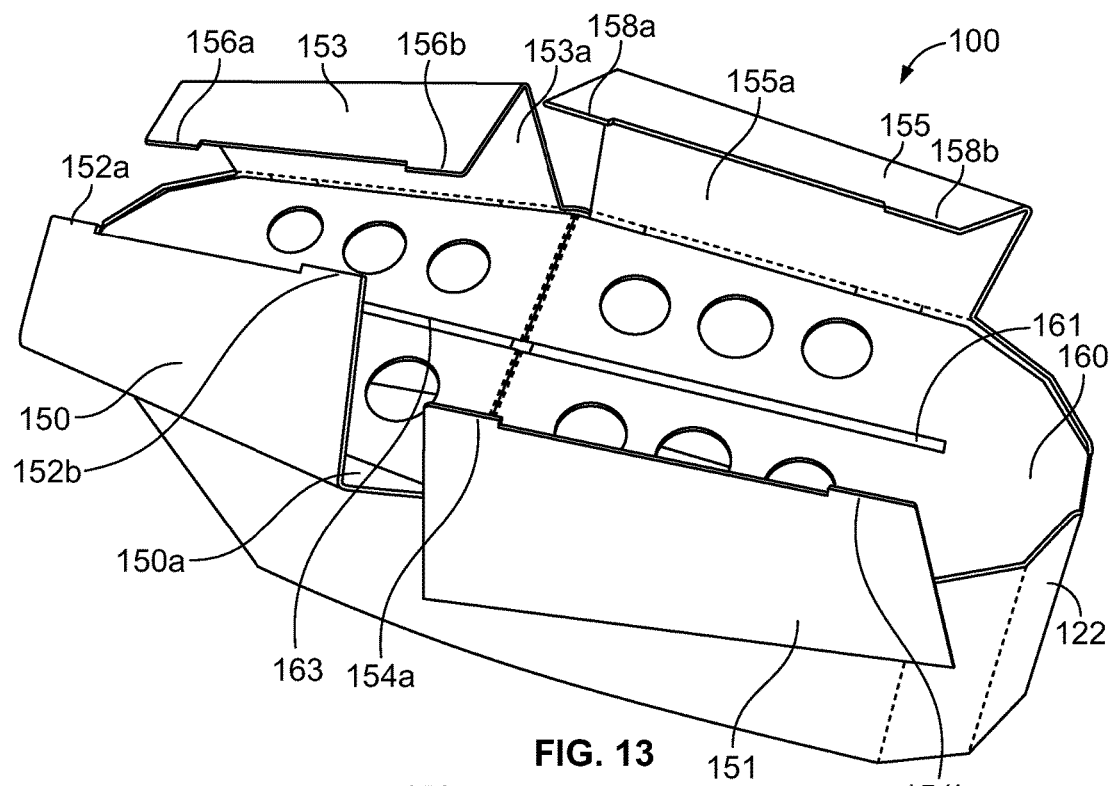
FIG. 13 is a perspective bottom view of package enclosure 100 shown in FIGS. 7-12 at a third stage of construction.
Figure 14:
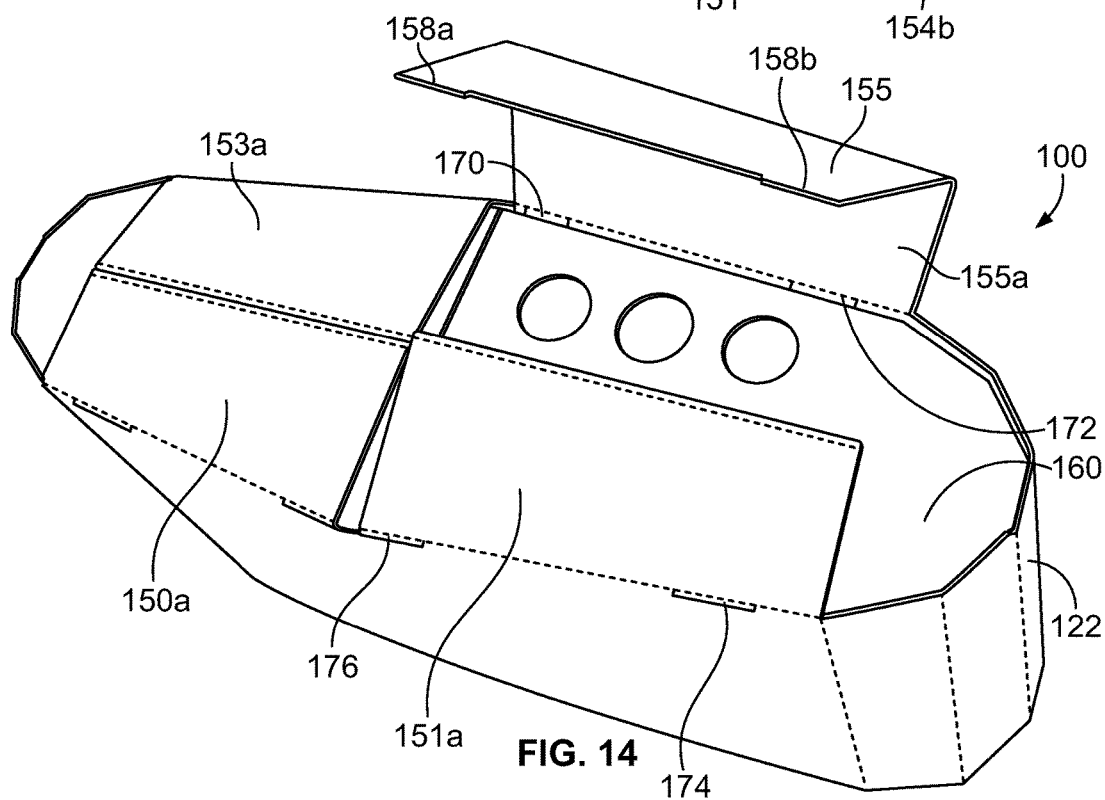
FIG. 14 a perspective bottom view of package enclosure 100 shown in FIGS. 7-13 at a fourth stage of construction.

In FIG. 11, handle 130 and front and rear portions of base 160 are shown being inserted into outer skin 110, with front and rear portions of base 160 attached to front and rear end walls, respectively To fully insert base 160 into outer skin 110, the rear end of base 160 abuts rear wall 122 and front end of base 160 abuts front wall 120. Transverse section 134 of handle 130 is forced downwardly until front and rear ends of base 160 are in a horizontal position, at the same time drawing in left and right side walls of outer skin 110 as shown in FIG. 12. Base 160 includes holes 160a cut out to reduce weight and improve the hoop strength of base 160. Base 160 further includes longitudinal slots 161 and 163 through which base supports 150a, 151a, 153a, and 155a extend through (as shown in FIGS. 13 and 14). In FIG. 12, upwardly extending tab 137 has not yet been passed through slot 142a of tab 142, and upwardly extending tab 139 has not yet passed through slot 140a of tab 140.

FIG. 13 is a perspective bottom view of package enclosure 100 shown in FIGS. 7-12 at a third stage of construction. In FIG. 13, base supports 151 and 155 are ready for insertion through slot 161 of base 160. Similarly, base supports 150 and 153 are ready for insertion through slot 163 of base 160.

Figure 15:
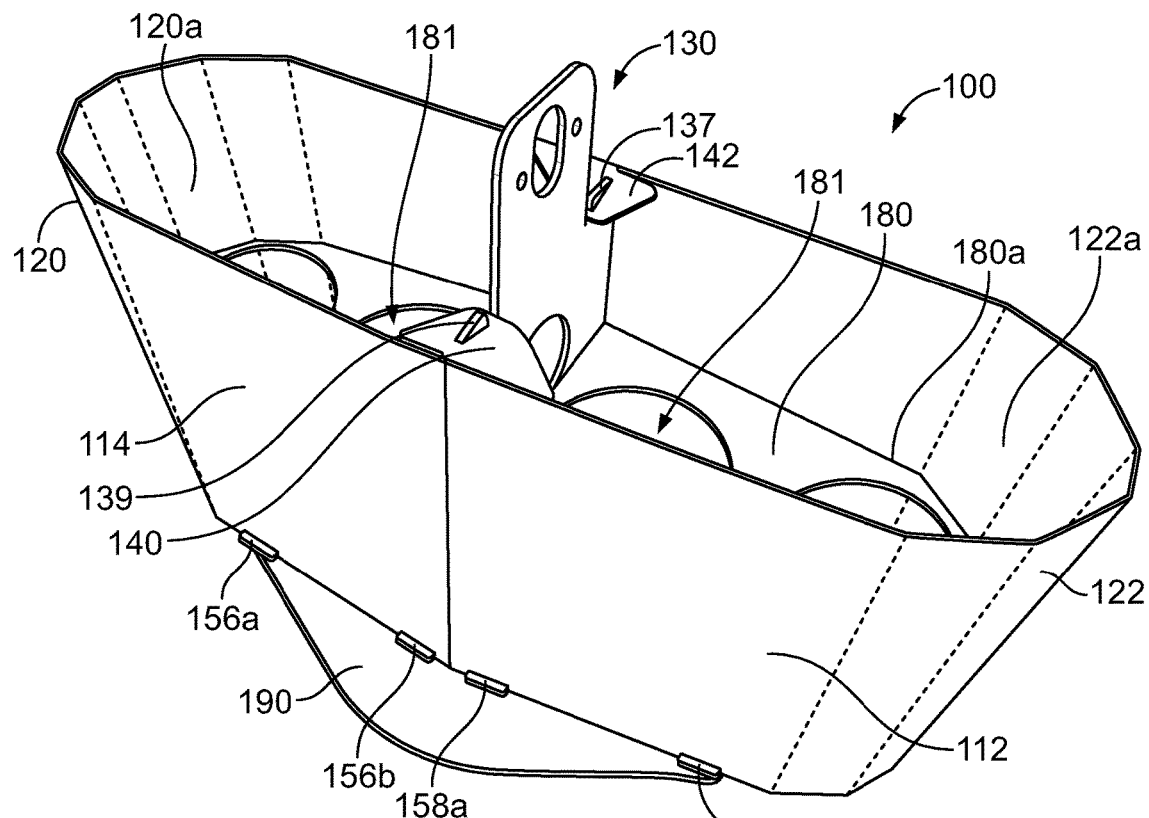
FIG. 15 is a perspective view of package enclosure 100 shown in FIGS. 7-14 with transverse content holder 180 in position within the package enclosure.

FIG. 14 a perspective bottom view of package enclosure 100 shown in FIGS. 7-13 at a fourth stage of construction after base supports 150 and 153 have been inserted through slot 163 of base 160. Eventually, tabs 154a and 154b will extend through slots 176 and 174 respectively in the rear right side wall, and tabs 158a and 158b will extend through corresponding slots in the rear left side wall. In FIG. 15, the package enclosure is in a fully constructed state with tabs 158a and 18b extending through slots in the rear left side wall 112, and tabs 156a and 156b extending through slots in the front left side wall 114. In FIG. 15, a transverse content holder 180 has been inserted into outer skin 110 positioned on both sides of transverse section 134 of handle 130. The transverse content holder 180 exerts outer forces against the inner surfaces of the front and rear end walls, and against the left and right side walls. In this manner, like base 160, transverse content holder 180 serves as a rib to provide tension on the outer skin 110 to impart strength and rigidity to package enclosure 100.

Transverse content holder advantageously includes apertures 181 for holding contents, such as drinks, in a stable position during flight to at delivery site, and during delivery. In FIG. 15, flap 140 has been moved downwardly such that tab 139 on transverse section 134 of handle 130 extends through a slot in flap 140. Similarly, flap 142 has been moved downwardly such that tab 1379 on transverse section 134 of handle 130 extends through a slot in flap 142. In FIG. 15, a stabilizing footing 190 is positioned on the bottom of package enclosure 100 to provide stability when placed on the ground to prevent the package enclosure 100 from tipping over when on the ground or during delivery from a UAV.

Figure 16:
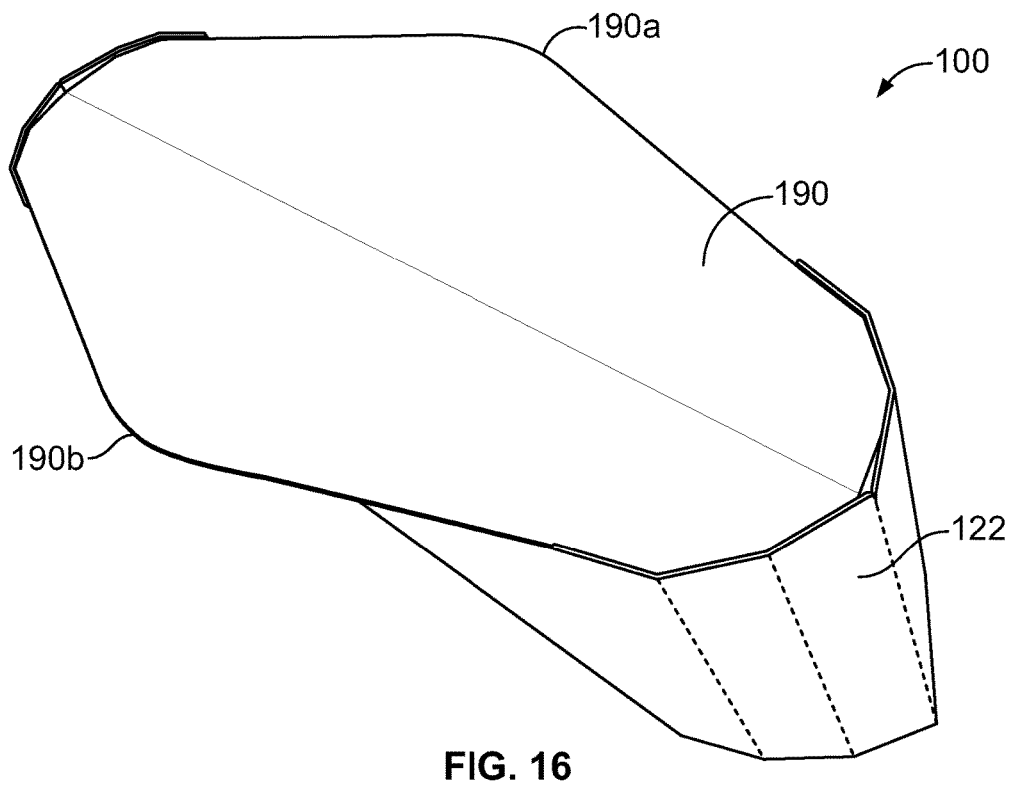
FIG. 16 is a bottom perspective view of package enclosure 100 shown in FIGS. 7-15 with a stabilizing footing 190.

FIG. 16 is a bottom perspective view of package enclosure 100 shown in FIGS. 7-15 with a stabilizing footing 190. Stabilizing footing 190 includes sides 190a and 190b that extend beyond the side walls of package enclosure 100 to provide for stable positioning of packaging enclosure 100 when on the ground.

The package enclosure 100 is shaped like an air foil with improved aerodynamic characteristics. Package enclosure 100 may have a coefficient of drag of 0.35 or less, and in some embodiments 0.28 or less. When carried beneath a UAV, package enclosure 100 provides a very lightweight and structurally sound enclosure with improved aerodynamics in comparison to a box-shaped enclosure.

Figure 17:
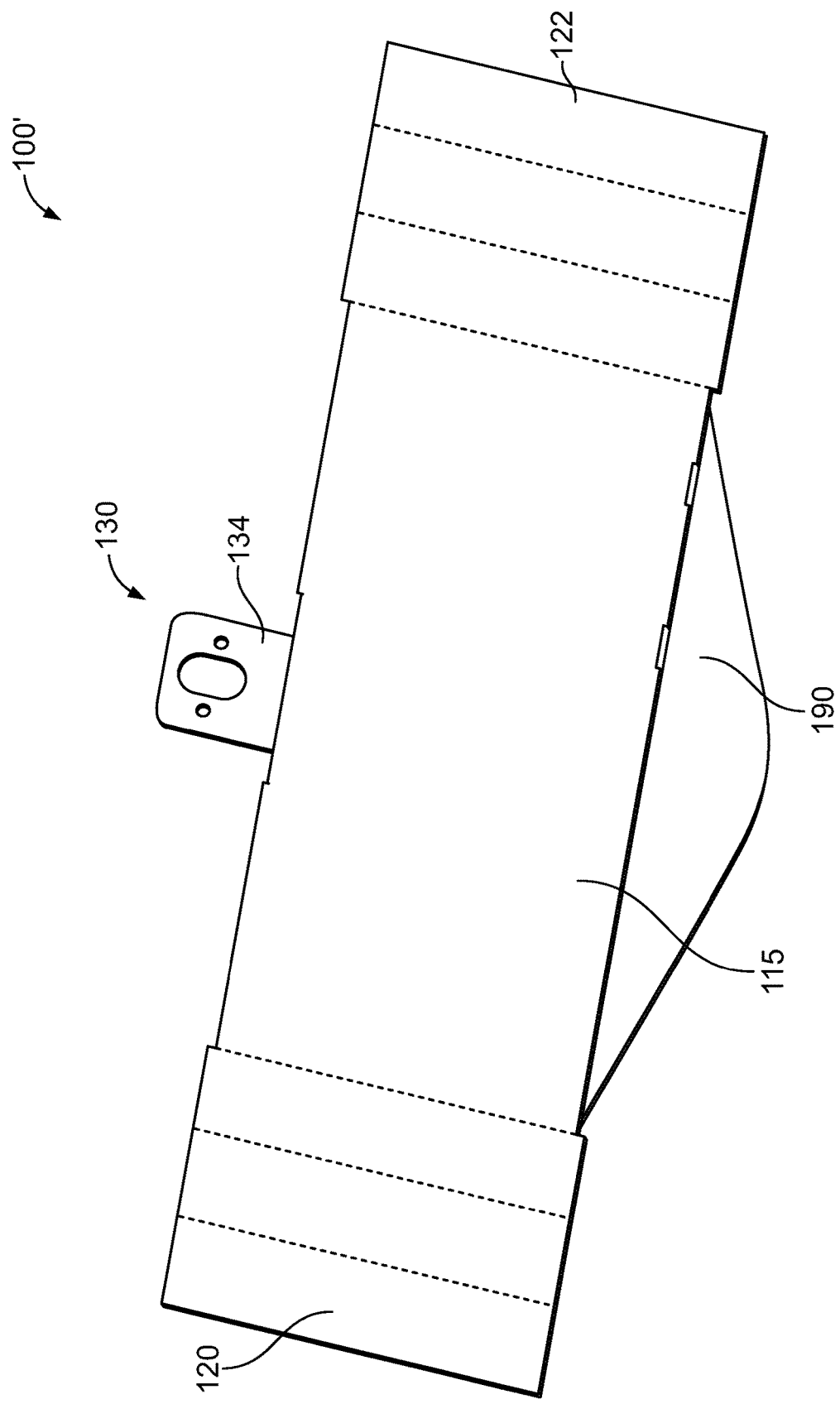
FIG. 17 is a side view of package enclosure 100' prior to construction, according to an example embodiment.

FIG. 17 is a side view of package enclosure 100' prior to construction, according to an example embodiment. Package enclosure 100' has the same general outer aerodynamic shape as package enclosure 100, but is constructed differently. As with package enclosure 100, package enclosure 100' lies completely flat prior to construction which reduces storage required to store unconstructed package enclosures, and also reduces transportation space required to transport unconstructed package enclosures. Furthermore, when deconstructed, package enclosure 100' lies flat and can be disposed of easily without taking up a great deal of space. In FIG. 17, package enclosure 100' has front end 120, rear end 122, and a left side wall 115 having an inner surface positioned adjacent an inner surface of a right side wall 117 (shown in FIG. 18). Components of the base are positioned between left side wall 115 and right side wall 117. Handle 130 having central portion 134 extends upwardly between the left and right side walls 115, 117. A stabilizing footing 190 is shown extending downwardly from the side walls.

FIG. 18 is a perspective top view of package enclosure 100' shown in FIG. 17 at a first stage of construction. In package enclosure 100', base portion 193 is attached to the bottom of right side wall 117 and is pushed downwardly towards left side wall 115. Base portion 193 includes tabs 193a and 193b that will extend through slots in left side wall 115. In the same manner, base portion 195 is attached to the bottom of left side wall 115 and is pushed downwardly towards right side wall 117. Base portion 195 includes tabs 195a and 195b that will extend through slots in right side wall 117. Stabilizing footing 190 is positioned beneath base portions 193 and 195 and extends beneath and beyond left and right side walls 115, 117.

In package enclosure 100', the handle 130 is not attached to the base as in package enclosure 100, and is instead attached to the side walls above the base portions. In particular, as shown in FIG. 18, handle section 134 has a first extension which is shown positioned within a slot formed between the inner surface of left side wall 115 and overlaid section 115b. Tab 139a extends upwardly from handle section 134 and through a slot 115a formed at the intersection of left side wall 115 and overlaid section 115b. A second extension 139 extends from handle section 134 having a tab 139a that extends upwardly and is adapted to extend through slot 117a formed at an intersection of an overlaid section extending against inner surface 117a of right side wall 117. The second extension 139 is adapted to be positioned in a slot formed between the overlaid section and inner surface 117a of right side wall 117.

FIG. 19 is a perspective top view of package enclosure 100' shown in FIGS. 17 and 18 at a second stage of construction. In FIG. 19, the extensions of handle section 134 are positioned within the slots formed on side walls 115 and 117, and handle section 134 extends perpendicularly between side walls 115 and 117.

Figure 20:
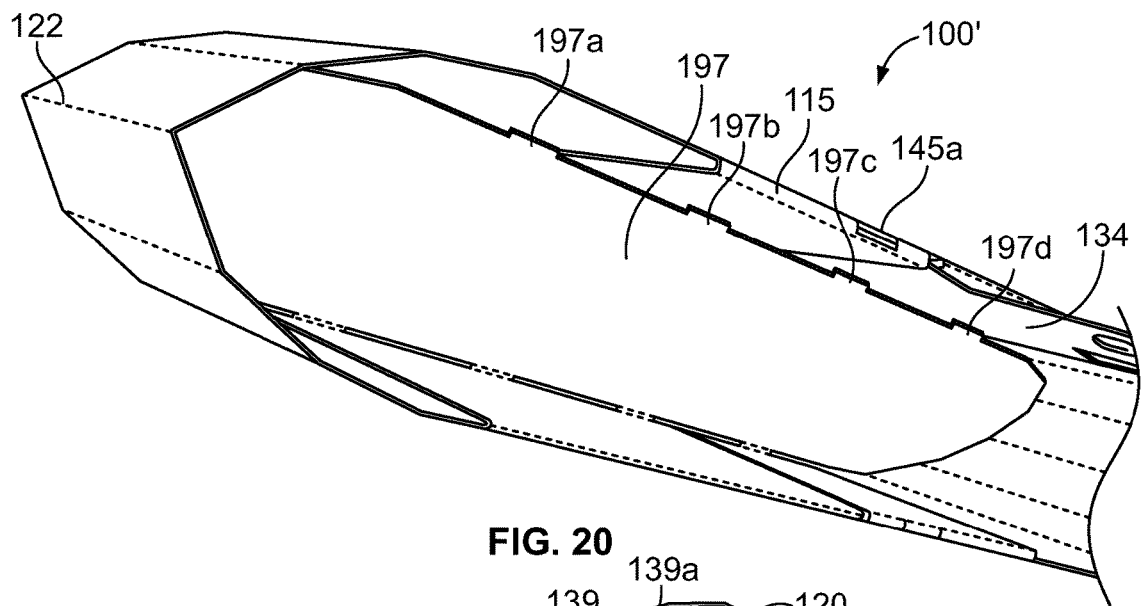
FIG. 20 is a perspective top view of package enclosure 100' shown in FIGS. 17-20 with an alternate base design at a first stage of construction.
Figure 21:
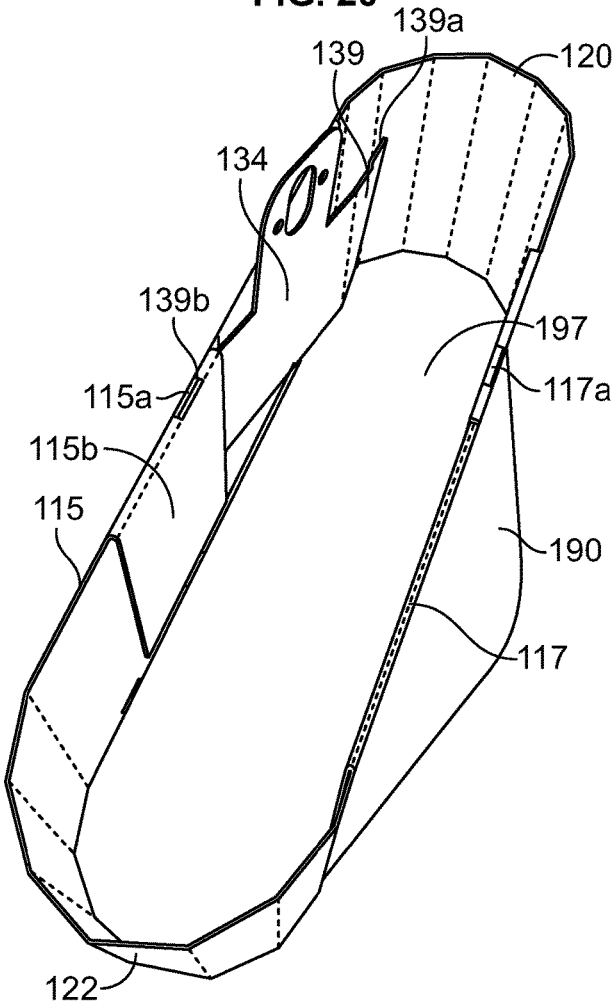
FIG. 21 is a perspective view of package enclosure 100' shown in FIG. 20 at a second stage of construction.

FIG. 20 is a perspective top view of package enclosure 100' shown in FIGS. 17-20 with an alternate base design at a first stage of construction. In FIG. 20, base 197 is attached to the bottom of right side wall 117. Base 197 includes tabs 197a-d that are adapted to extend through slots positioned in left side wall 115. FIG. 21 is a perspective view of package enclosure 100' shown in FIG. 20 at a second stage of construction wherein the base 197 is positioned between left side wall 115 and right side wall 117. Handle section 134 is constructed the same as handle section 134 shown in FIGS. 18 and 19 and is held in place in slots in the walls in the same manner as shown in FIGS. 18 and 19. Stabilizing footing 190 is shown in FIG. 21 extending beneath and beyond the side walls 117 and 115 of package enclosure 100'.

Base sections 193 and 195 shown in FIGS. 18 and 19, and base 197 shown in FIGS. 20 and 21 act as a rib or ribs exerting forces against inner surfaces of side walls 115 and 117 and inner surfaces of rear end 122 and front end 120. In this manner, base sections 193 and 195, and base 197 impart strength and rigidity to package enclosure 100' and to package enclosure 100' to provide a lightweight and structurally sound package enclosure.

Figure 22:
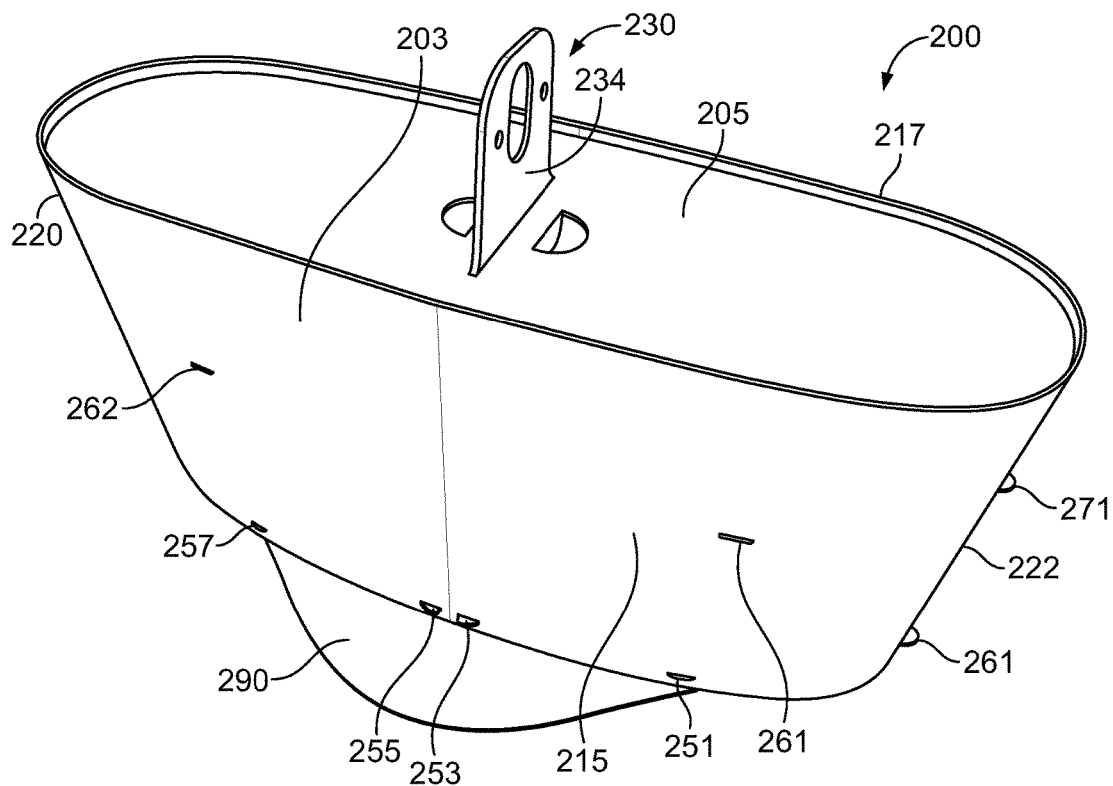
FIG. 22 is a top perspective view of package enclosure 200, according to an example embodiment.

FIG. 22 is a top perspective view of package enclosure 200, according to an example embodiment. Package enclosure 200 has the same general shape as package enclosures 100 and 100' described above but is constructed differently. Package enclosure 200 in FIG. 22 is shown in a fully constructed state including outer skin 203, left side wall 215, right side wall 217, front end 220, rear end 222, handle 230 with transverse section 234, top 205, and stabilizing footing 290. Tabs 251 and 253 are shown extending from an inner base section (not shown) through slots in side wall 215, and tabs 255 and 257 are shown extending from an inner base section (not shown) through slots in side wall 215. Tab 261 is shown extending from an inner content holder (not shown) through side wall 215, and tab 262 is shown extending from content holder (not shown) through side wall 215.

Figure 23:
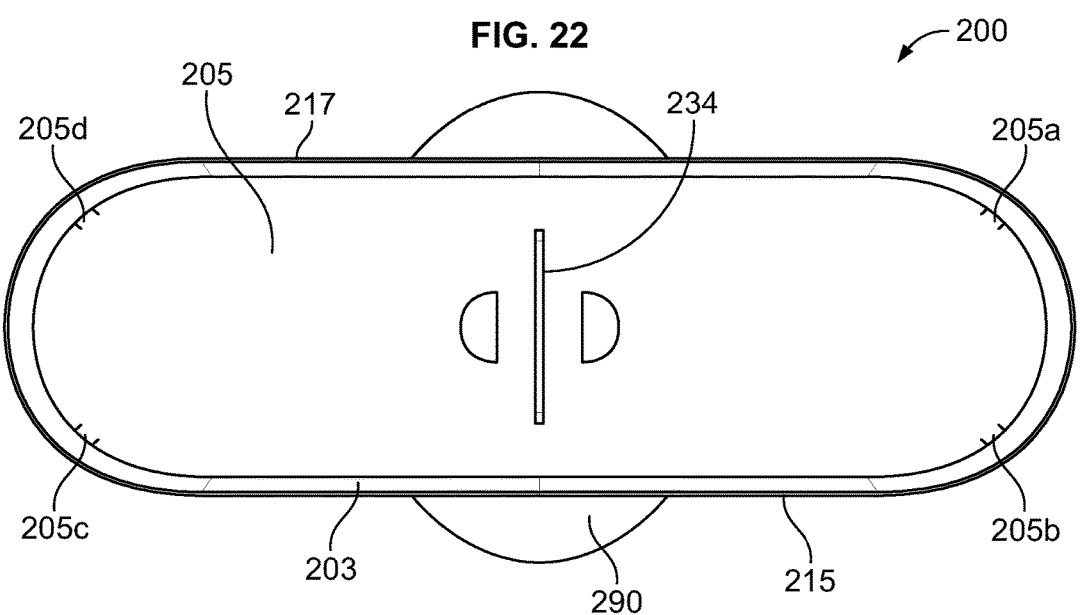
FIG. 23 is a top view of package enclosure 200 shown in FIG. 22.

FIG. 23 is a top view of package enclosure 200 shown in FIG. 22. Top 205 may include tabs 205a-d extending through the outer skin 203 of the package enclosure. Transverse section 234 of handle 230 is shown extending through a slot in the top 205. Stabilizing footing 290 is shown extending beneath and beyond the side walls 215 and 217 of outer skin 203.

Figure 24:
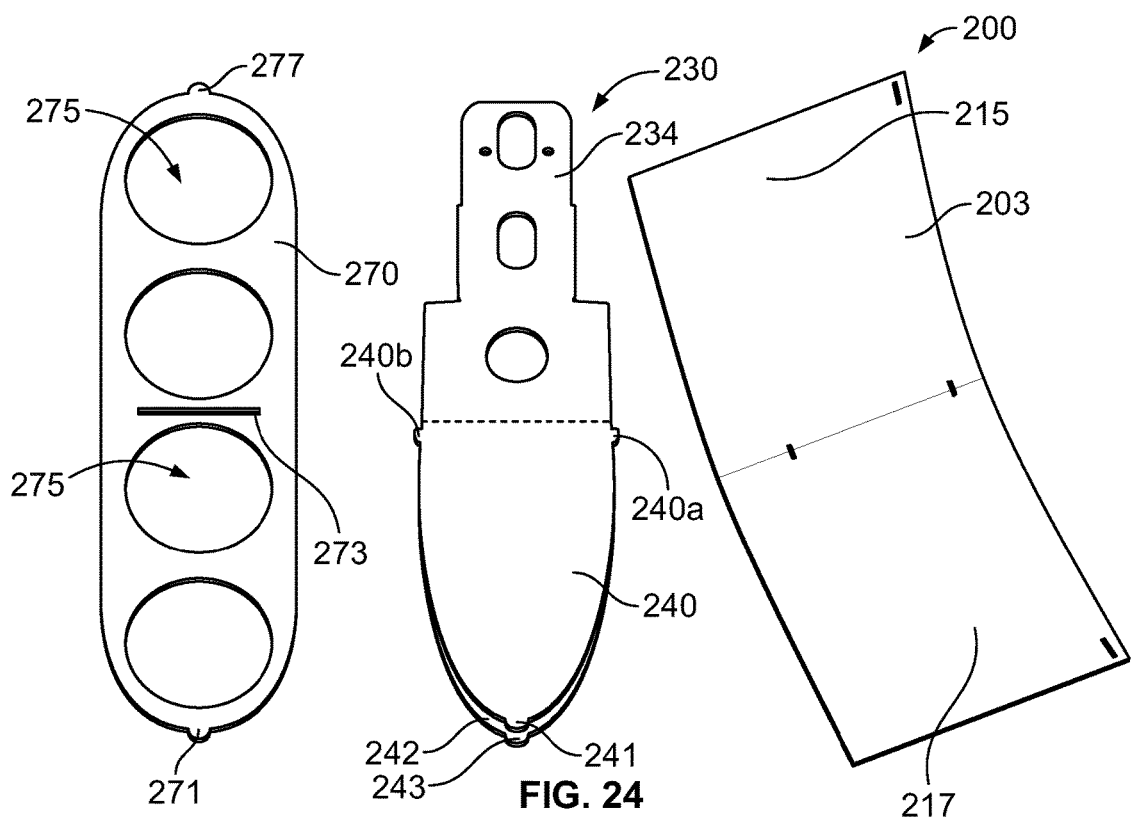
FIG. 24 is a perspective view of package enclosure 200 shown in FIGS. 22 and 23 prior to construction.

FIG. 24 is a perspective view of package enclosure 200 shown in FIGS. 22 and 23 prior to construction. As shown in FIG. 24, the components of the package enclosure 200 all lie flat prior to construction, including outer skin 203, handle 230, base sections 240 and 242, and content holder 270.

Content holder 270 includes apertures 275 for holding package contents, such as drinks, or medical supplies for delivery. A slot 273 is included in content holder 270 through which transverse section 234 of handle 230 extends (shown in FIG. 23). Content holder 270 further includes tabs 271 and 277 that are adapted to extend through slots in the rear and front end walls 220 and 222 of outer skin 203 (as shown in FIG. 22).

Base sections 240 and 242 are attached to the bottom of transverse section 234 of handle 230. Tabs 240a and 240b extend from sides of base section 240 and are adapted to extend through slots on the side walls 215 and 217, respectively, of outer skin 203. Similarly, tabs 241 and 243 extend from the ends of base sections 240 and 242 respectively, that are adapted to extend through slots positioned in the rear and front end walls of outer skin 203.

Figure 25:
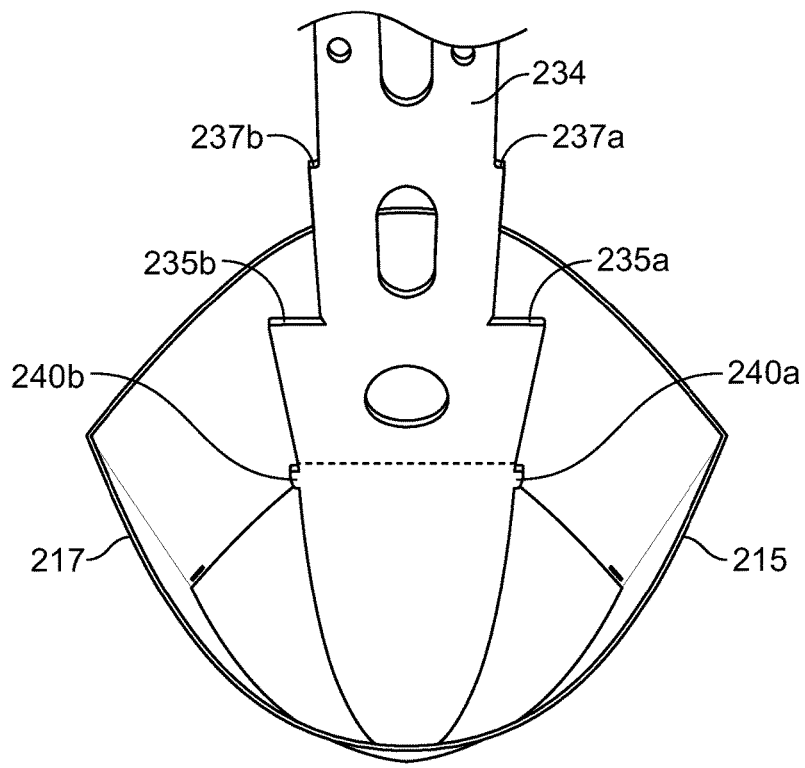
FIG. 25 is a perspective top view of package enclosure 200 shown in FIGS. 22-24 in a first stage of construction.

FIG. 25 is a perspective top view of package enclosure 200 shown in FIGS. 22-24 in a first stage of construction. To construct package enclosure 200, the outer skin is opened to separate side walls 215 and 217, and base sections 240 and 242 are inserted within the outer skins 203 between side walls 215 and 217. Initially tabs 241 and 243 of base sections 240 and 242 are inserted into slots in the front and rear ends of outer skin 203 as shown in FIG. 25. Also as shown in FIG. 25, transverse section 234 of handle 230 includes a first pair of shoulders 235a and 235b that are designed to support content holder 275 (shown in FIG. 24). Transverse section 234 of handle 230 also includes a second pair of shoulders 237a and 237b that are designed to support a top 205 (shown in FIG. 22).

Figure 26:
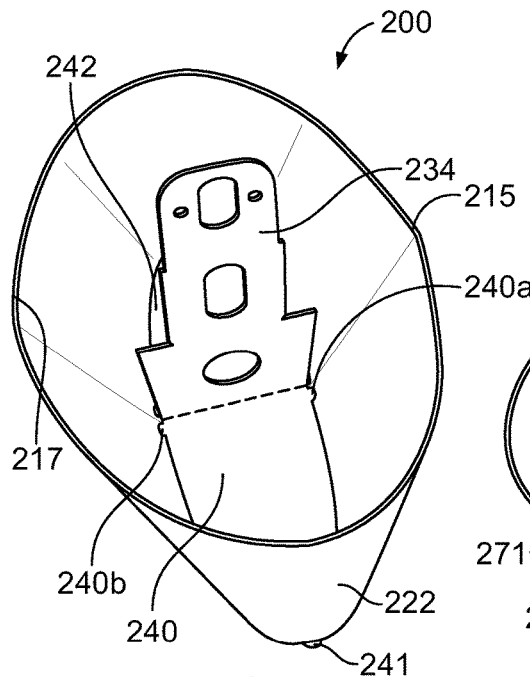
FIG. 26 is a perspective top view of package enclosure 200 shown in FIGS. 22-25 at a second stage of construction.

FIG. 26 is a perspective top view of package enclosure 200 shown in FIGS. 22-25 at a second stage of construction. Package enclosure 200 advantageously provides for an "over center" kinematic such that by pushing down on transverse section 234 of handle 230, the base sections 240 and 242 are moved into a horizontal position at the bottom and between outer side walls 215 and 217. Pushing down on transverse section 234 of handle 230 draws side walls 215 and 217 inwardly towards base sections 240 and 242 and tabs 240a and 240b on base section 240 extend through slots in side walls 215 and 217. Similar tabs on base section 242 also extend through side walls 215 and 217. Thus, a single downward push on transverse section 234 of handle 230 is used to snap the package enclosure into place with base sections 240 and 242 secured to side walls 215 and 217 and to front and rear ends 220 and 222. In this manner, base sections 240 and 242 serve as a rib to provide outward forces against inner surfaces of side walls 215 and 217 and front and rear end walls 220 and 222. Thus, base sections 240 and 242 provide strength and rigidity to package enclosure 200 by exerting a tension on outer skin 203. As a result, package enclosure 200 is a lightweight and structurally sound package enclosure.

Figure 27:
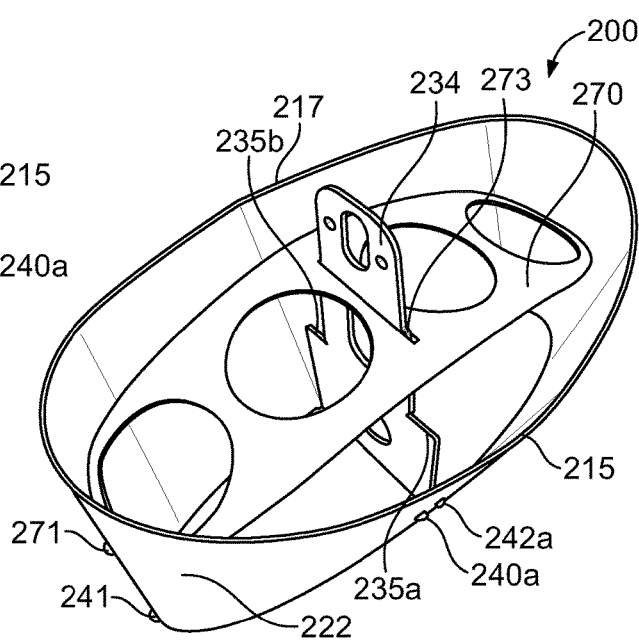
FIG. 27 is a perspective top view of package enclosure 200 shown in FIGS. 22-26 at a third stage of construction.
Figure 28:
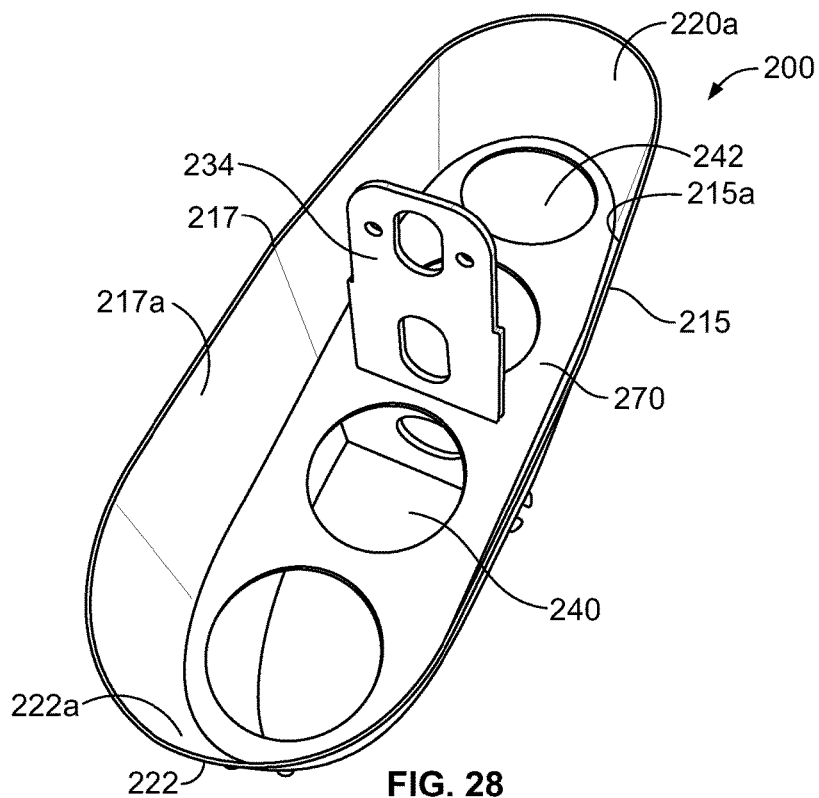
FIG. 28 is a perspective top view of package enclosure 200 shown in FIGS. 22-27 at a fourth stage of construction.

FIG. 27 is a perspective top view of package enclosure 200 shown in FIGS. 22-26 at a third stage of construction. In FIG. 27, content holder 270 is positioned within package enclosure 200. In a similar manner to base sections 240 and 242, content holder has end tabs 271 and 277 that extend through slots in the front and rear end walls, and transverse section 234 of handle 230 extends through slot 273 in content holder 270. As shown in FIG. 27, content holder 270 is bowed upwardly, and then pushed downwardly, (as shown in FIG. 22) until it rests on first pair of shoulders 235a and 235b (shown in FIG. 25). Content holder 270 may also include tabs that extend through side walls 215 and 217 as well. In this manner, content holder 270 also serves as a rib exerting outward forces on side walls 215 and 217, as well as front and rear end walls 220 and 222 of outer skin 203 of package enclosure 200. Thus, content holder 270 provides further strength and rigidity to package enclosure 200 by exerting a tension on outer skin 203. As a result, package enclosure 200 is a lightweight and structurally sound package enclosure.

As shown in FIG. 22, a top 205 may also be positioned within outer skin 203 of package enclosure 200. Top 205 may serve as a further rib exerting outward forces on side walls 215 and 217, as well as front and rear end walls 220 and 222 of outer skin 203 of package enclosure 200. Thus, top 205 provides even further strength and rigidity to package enclosure 200 by exerting a tension on outer skin 203.

Figure 29:
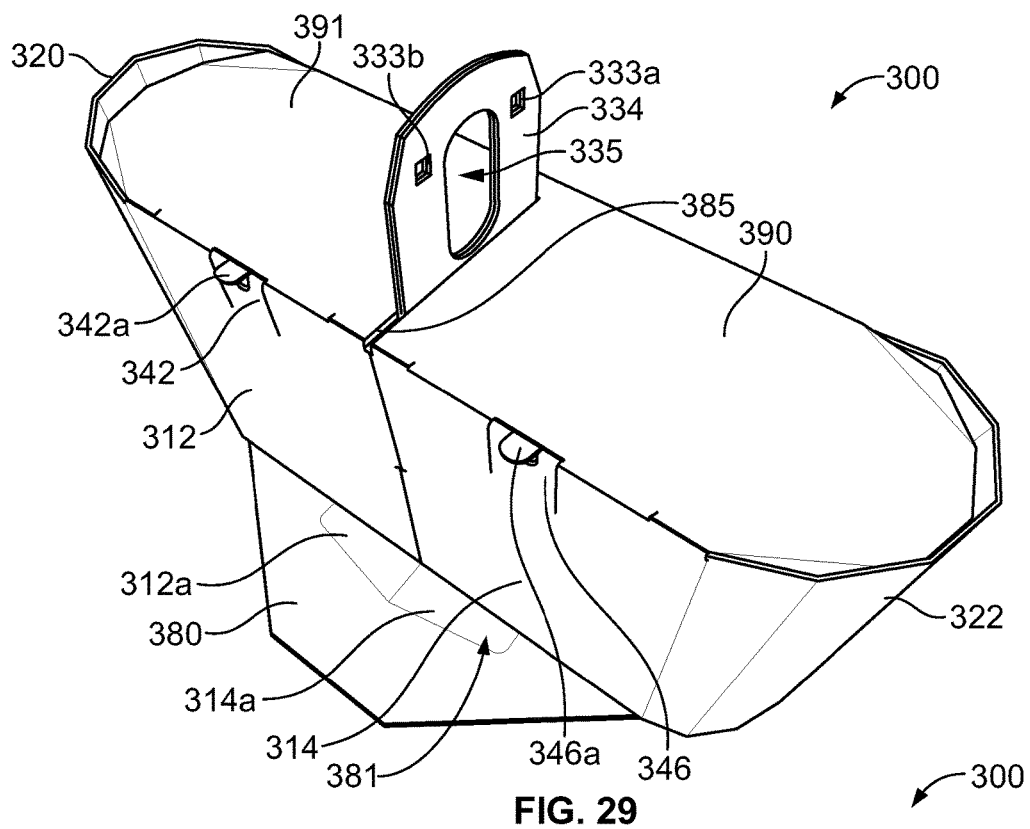
FIG. 29 is a perspective top view of package enclosure 300, according to an example embodiment.

FIG. 29 is a perspective top view of package enclosure 300, according to an example embodiment. Package enclosure 300 has the same general shape as package enclosures 100, 100', and 200 discussed above, but is constructed differently. In particular, in package enclosure 300, all of the components of the package enclosure including the side walls 312, 314, and 318, front end 320, rear end 322, handle sections 334a and 334b, base 360, stabilizing footing 362, 380, and top sections 390 and 391 are integrally formed as a single contiguous piece of material. Various folding steps are used to construct package enclosure 300.

Package enclosure further includes a slot 385 between top sections 390 and 391 through which handle 334 extends. Handle 334 includes an aperture 335 which may be used for attachment to the UAV, and which may also serve as a convenient carrying handle by an end user following delivery of package enclosure 300. Handle 334 further includes apertures 333a and 333b that may be used to further secure package enclosure 300 to a UAV. Top sections 390 and 391 are secured to side walls 314 and 312 using flap 346 and tab 346a and using flap 342 and tap 342a. An extending portion 312a from side wall 312 extends into aperture 381 in stabilizing footing 380. Similarly an extending portion 314a from side wall 314a extends into aperture 381 in stabilizing footing 380.

Figure 30:
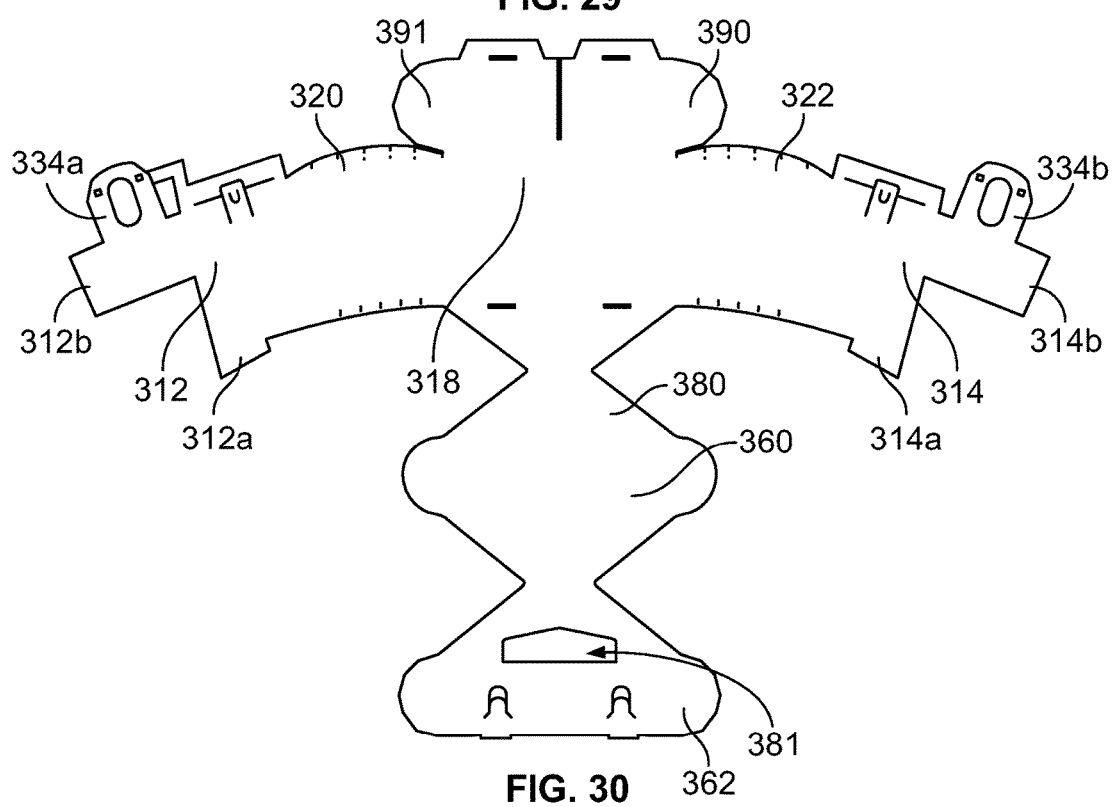
FIG. 30 is a top view of package enclosure 300 shown in FIG. 29 in an unconstructed state with the components lying flat.

FIG. 30 is a top view of package enclosure 300 shown in FIG. 29 in an unconstructed state with the components lying flat. As noted above, all of the components of package enclosure 300 may be formed of a single contiguous piece of material. In particular, as shown in FIG. 30, handle section 334a is contiguous to side wall 312. Side wall 312 is contiguous with front end wall 320. Front end wall 320 is contiguous with side wall 318 (noted in FIG. 39). Side wall 318 is also contiguous with top sections 390 and 391 as well as rear end wall 322. Side wall 318 is also contiguous with base 360 and stabilizing footing sections 380 and 362. Rear end wall 322 is contiguous with side wall 314. Side wall 314 is also contiguous with handle section 334b.

Figure 31:
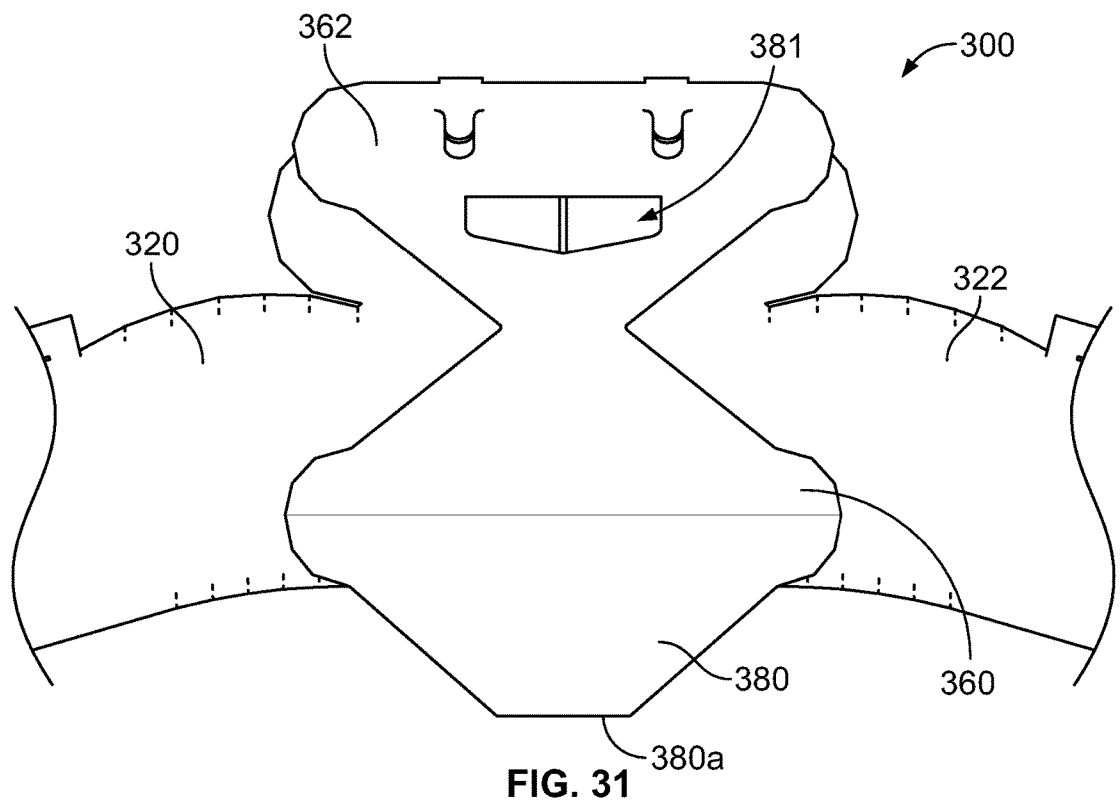
FIG. 31 is a top view showing a step in the construction of the package enclosure 300 shown in FIGS. 29 and 30.

FIG. 31 is a top view showing a step in the construction of the package enclosure 300 shown in FIGS. 29 and 30. In particular, contiguous stabilizing footing section 380, base sections 360 and 362, and stabilizing footing 380 are folded upwardly along fold line 380a and positioned adjacent front end wall 320 and rear end wall 322.

Figure 32:
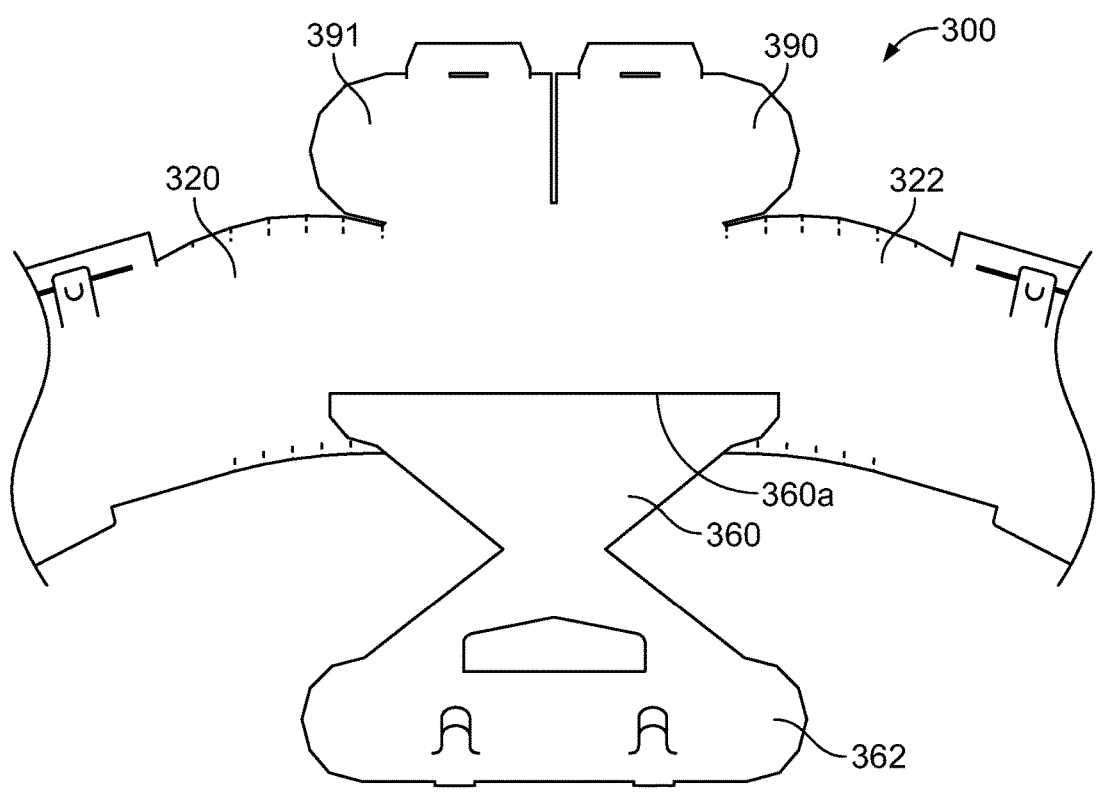
FIG. 32 is a top view showing another step in the construction of the package enclosure 300 shown in FIGS. 29-31.

FIG. 32 is a top view showing another step in the construction of the package enclosure 300 shown in FIGS. 29-31. In particular, contiguous base sections 360 and 362 are folded downwardly along fold line 360a.

Figure 33:
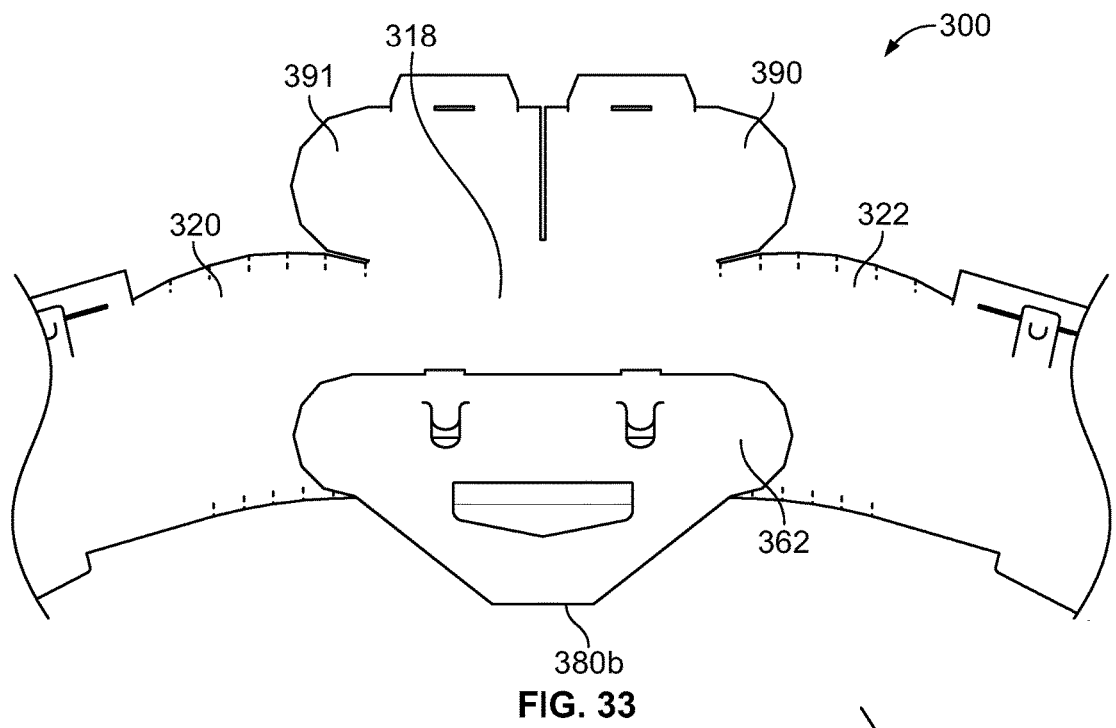
FIG. 33 is a top view showing another step in the construction of the package enclosure 300 shown in FIGS. 29-32.

FIG. 33 is a top view showing another step in the construction of the package enclosure 300 shown in FIGS. 29-32. In particular base section 362 is fold upwardly along fold line 380b and positioned adjacent front end wall 320 and rear end wall 322. An adhesive is provided on the base to which side walls 312 and 314 will be attached.

Figure 34:
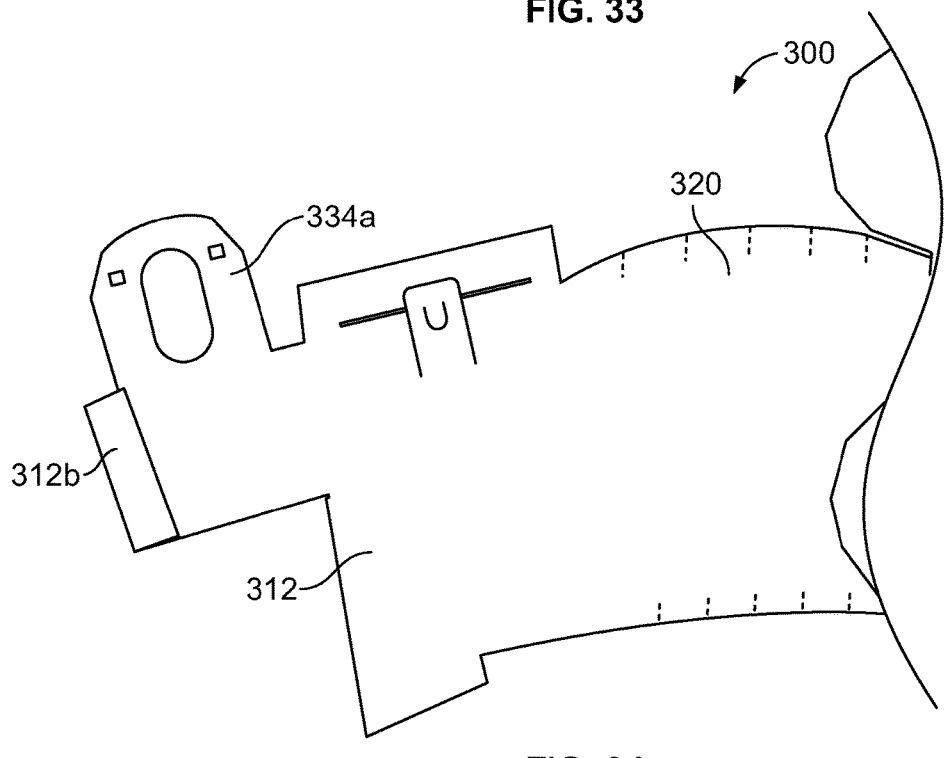
FIG. 34 is a top view showing another step in the construction of the package enclosure 300 shown in FIGS. 29-33.

FIG. 34 is a top view showing another step in the construction of the package enclosure 300 shown in FIGS. 29-33. In particular, extension 312b of handle is bent over handle section 334a and a piece of double sided tape is adhered to extension 312b for eventual securement to side wall 318. Although not shown in FIG. 34, handle section 334b is folded and taped in the same fashion for eventual securement to side wall 318.

Figure 35:
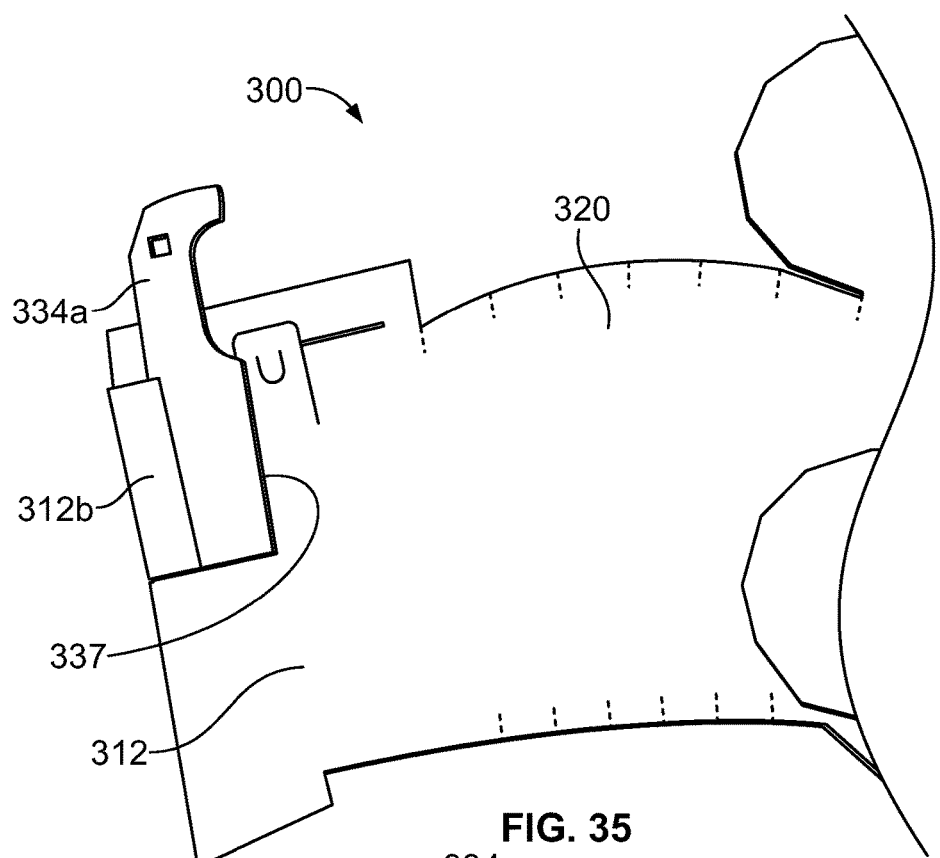
FIG. 35 is a top view showing another step in the construction of the package enclosure 300 shown in FIGS. 29-34.

FIG. 35 is a top view showing another step in the construction of the package enclosure 300 shown in FIGS. 29-34. In particular, handle section 334a is folded in half over itself. Although not shown in FIG. 35, handle section 334b is similarly folded in half over itself.

Figure 36:
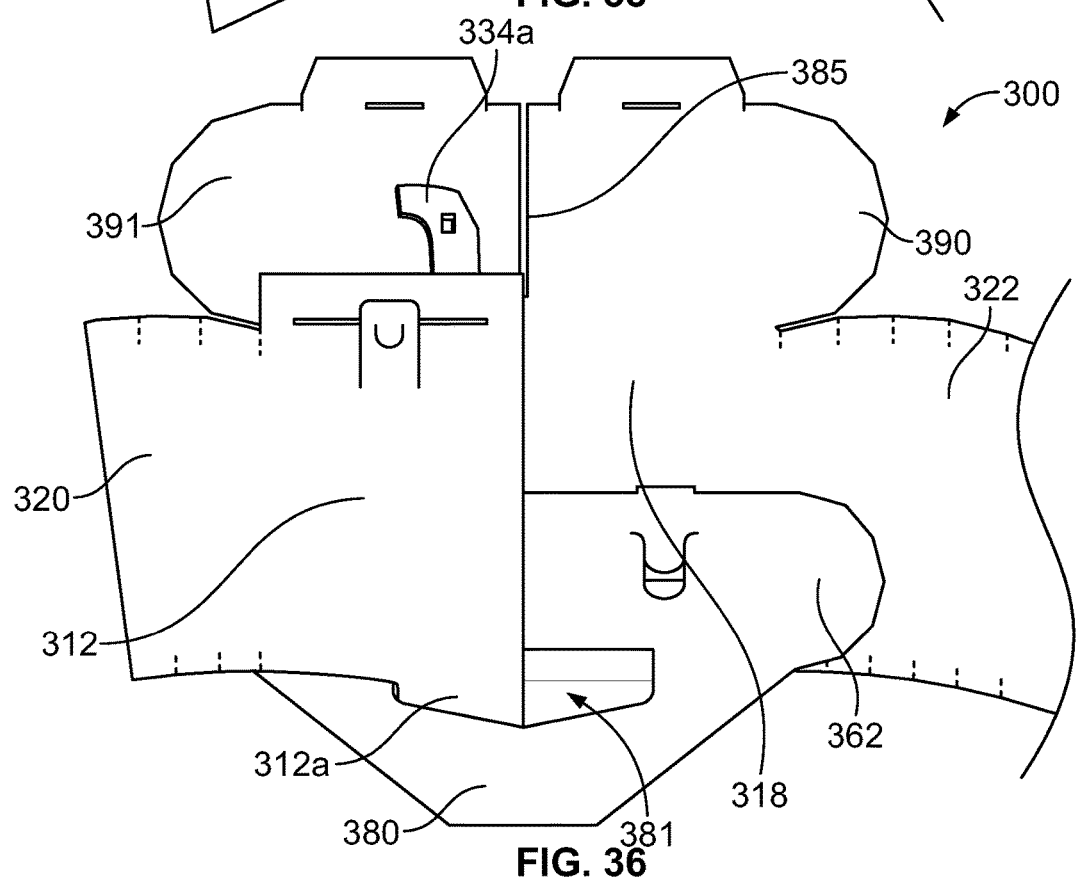
FIG. 36 is a top view showing another step in the construction of the package enclosure 300 shown in FIGS. 29-35.

FIG. 36 is a top view showing another step in the construction of the package enclosure 300 shown in FIGS. 29-35. In particular, front end wall 320 is folded in half over itself such that side wall 312 is positioned over side wall 318 and over base section 362. Extension 312a of side wall 312 extends within aperture 381 of stabilizing footing 380.

Figure 37:
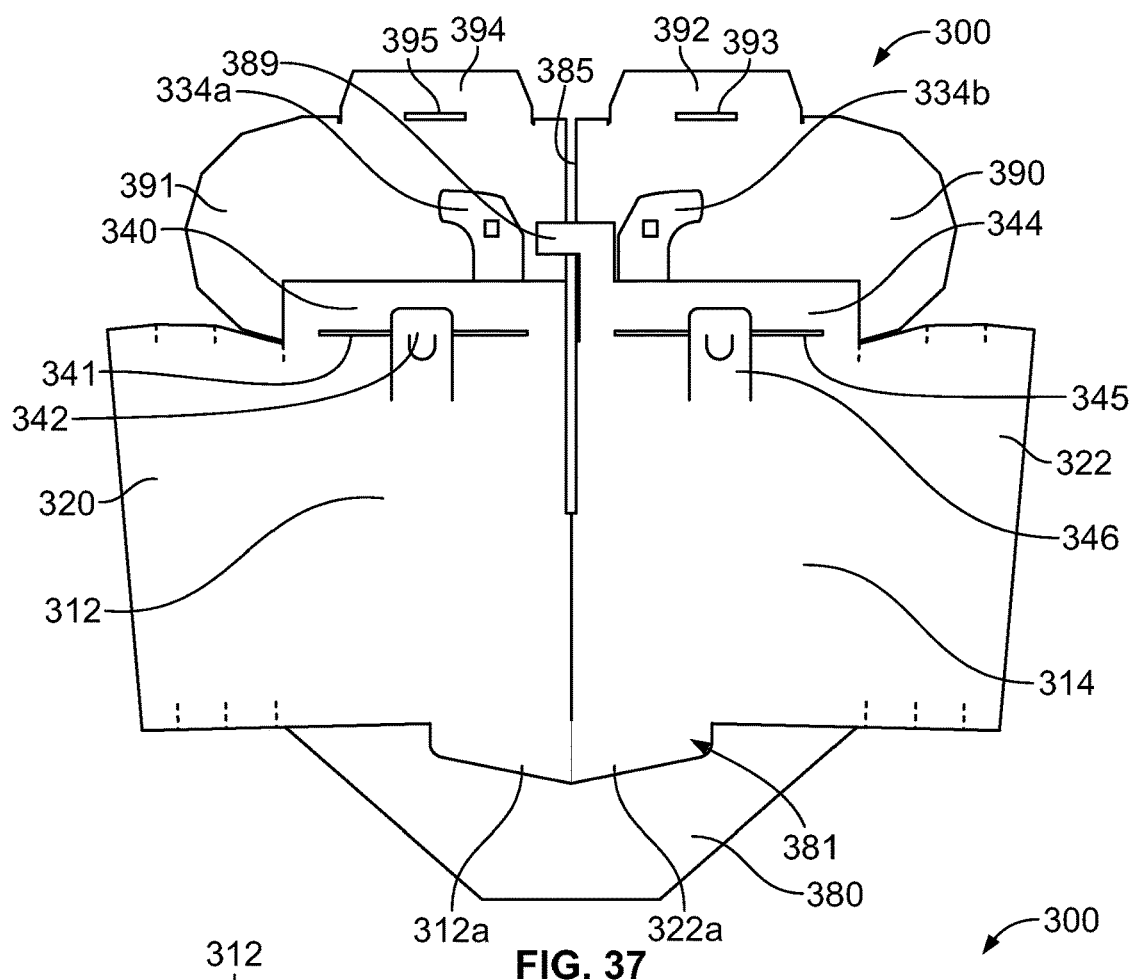
FIG. 37 is a top view showing another step in the construction of the package enclosure 300 shown in FIGS. 29-36.

FIG. 37 is a top view showing another step in the construction of the package enclosure 300 shown in FIGS. 29-36. In particular, rear end wall 322 is folded in half over itself such that side wall 314 is positioned over side wall 318 and over base section 362. Extension 314a of side wall 314 extends within aperture 381 of stabilizing footing 380. L-shaped tab 389 will ultimately be used to attach side wall 312 with side wall 314.

Figure 38:
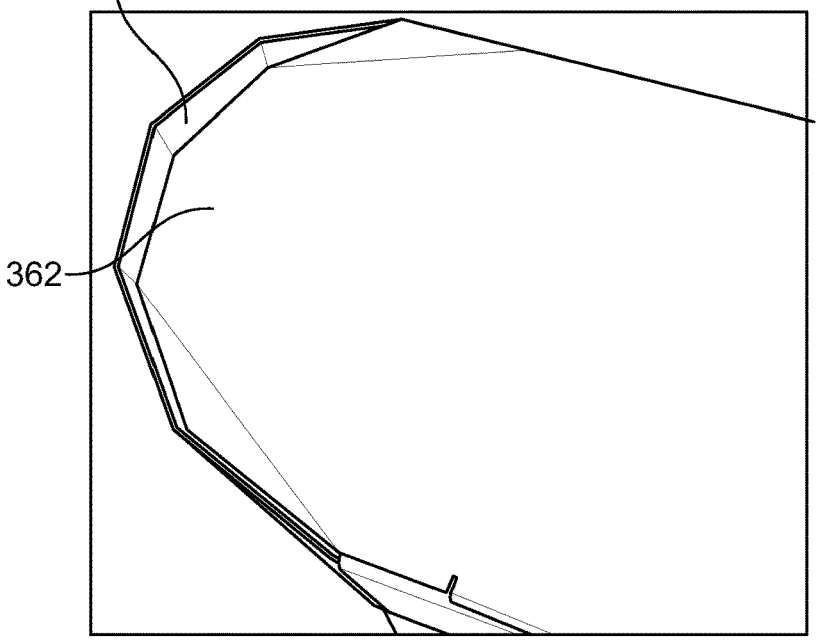
FIG. 38 is a partial bottom view of package enclosure 300 following a number of construction steps.

FIG. 38 is a partial bottom view of package enclosure 300 following a number of construction steps showing base section 362 positioned against rear wall 322.

FIG. 39 is a top view showing another step in the construction of the package enclosure 300 shown in FIGS. 29-38. In particular, side wall 318 is separated away from side walls 312 and 314, and handle sections 334a and 334b begin to open after having been folded over in half. Extensions of handle sections 334a and 334b are adhered to side wall 318. Top section 391 is shown with extension 394 having slot 395 extending above side wall 318 and top section 390 is shown with extension 392 having slot 393 extending above side wall 318. Slot 385 is shown positioned between top section 390 and top section 391, through which handle sections 334a and 334b will eventually extend through. Similarly, extension 340 with tab 342 is shown upwardly extending from side wall 312, and extension 344 with tab 346 is shown upwardly extending from side wall 314. Stabilizing footing 380 is shown positioned beneath base 362 and extending beneath and beyond side walls 312 and 314.

FIG. 40 is a top view showing another step in the construction of the package enclosure 300 shown in FIGS. 29-39. In particular, side wall 318 is further separated away from side walls 312 and 314, and handle sections 334a and 334b further open after having been folded over in half. Top section 391 is shown with extension 394 with slot 395 extending above side wall 318 and top section 390 is shown with extension 392 and slot 393 extending above side wall 318. Slot 385 is shown positioned between top section 390 and top section 391, through which handle sections 334a and 334b will eventually extend through. Similarly, extension 340 with tab 342 is shown upwardly extending from side wall 312 and extension 344 with tab 346 is shown upwardly extending from side wall 314. Stabilizing footing 380 is shown positioned beneath base 362 and extending beneath and beyond side walls 312 and 314.

Figure 41:
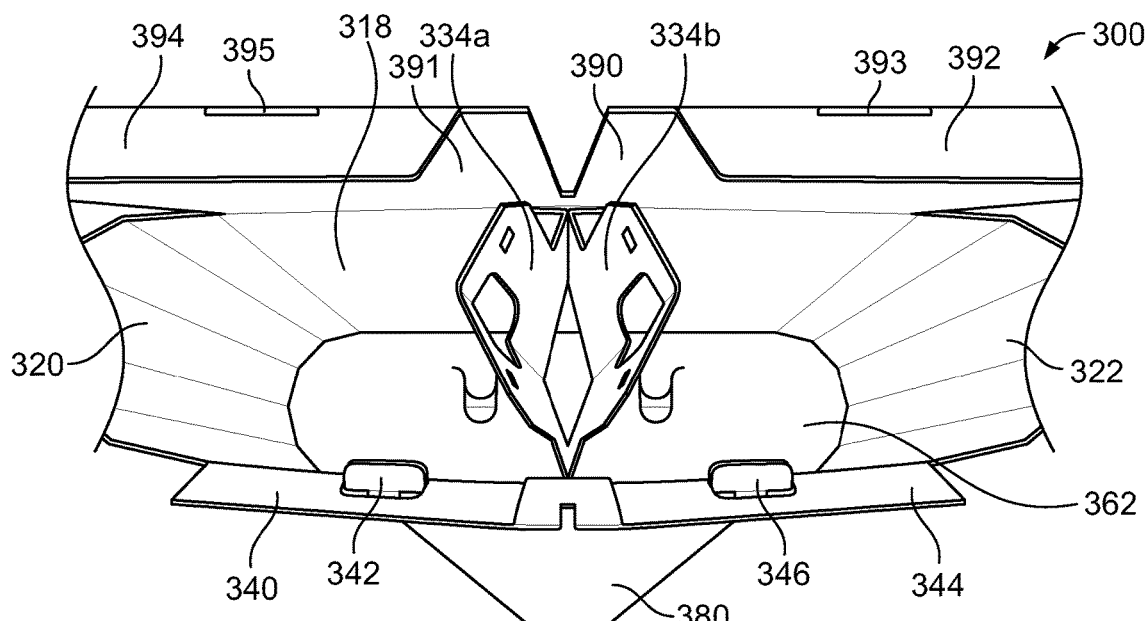
FIG. 41 is a top view showing another step in the construction of the package enclosure 300 shown in FIGS. 29-40.

FIG. 41 is a top view showing another step in the construction of the package enclosure 300 shown in FIGS. 29-40. In particular, side wall 318 is further separated away from side walls 312 and 314, and handle sections 334*a* and 334*b* begin to come together. Top section 391 is shown with extension 394 with slot 395 extending above side wall 318 and top section 390 is shown with extension 392 and slot 393 extending above side wall 318. Similarly, extension 340 with tab 342 pushed inwardly is shown upwardly extending from side wall 312 and extension 344 with tab 346 pushed inwardly is shown upwardly extending from side wall 314. Stabilizing footing 380 is shown positioned beneath base 362 and extending beneath and beyond side walls 312 and 314.

Figure 42:
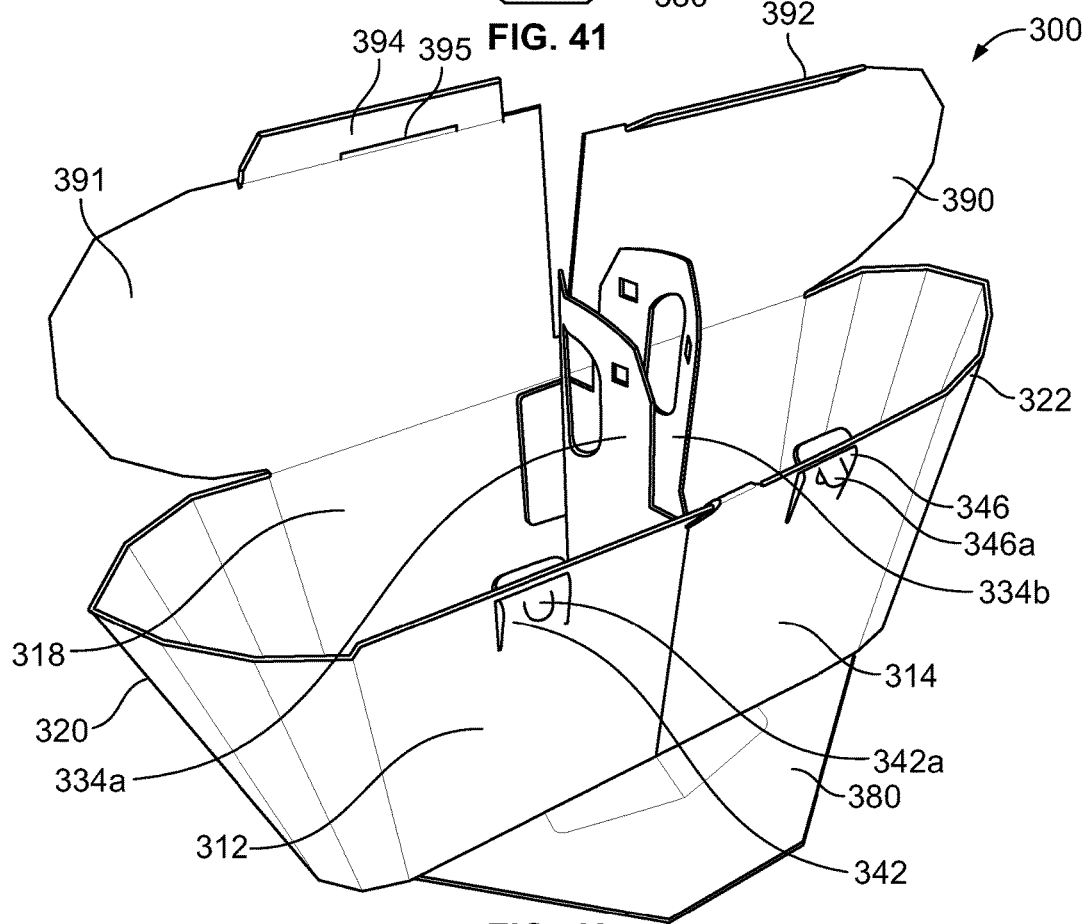
FIG. 42 is a top perspective view showing package enclosure 300 prior to closing lid sections 390 and 391.

FIG. 42 is a top perspective view showing package enclosure 300 prior to closing top sections 390 and 391. In particular, side wall 318 is further separated away from side walls 312 and 314, and handle sections 334*a* and 334*b* come further together. Top section 391 is shown with extension 394 with slot 395 extending above side wall 318 and top section 390 is shown with extension 392 and slot 393 extending above side wall 318. Tab 342 is shown pushed inwardly from side wall 312 and tab 346 is shown pushed inwardly from side wall 314 with tab 346*a* shown extending outwardly from side wall 314. Stabilizing footing 380 is shown positioned beneath base 362 and extending beneath and beyond side walls 312 and 314.

FIG. 29 is a top perspective view of package enclosure 300 after closing top sections 390 and 391 with handle sections 334*a* and 334*b* drawn into engagement to form handle 334. Handle 334 extends upwardly through slot 385 between top sections 390 and 391. Top sections 390 and 391 are secured into place with tab 346 extending through a slot in top section 390 and tab 342 extending through a slot in top section 391. Further, top sections 390 and 391 exert outward forces against front end wall 320 and rear end wall 322, as well as side walls 312, 314, and 318. In this manner, top sections 390 and 391 serve as a rib that places tensions on the side walls and end walls, thereby providing a rigid and structurally sound package enclosure. Extension 312*a* of side wall 312 is shown extending into aperture 381 of stabilizing footing 380 and extension 314*a* of side wall 314 is also shown extending into aperture 381 of stabilizing footing 380.

The components of package enclosures 100, 100', 200, and 300 may be constructed of various materials. For example, the outer skin may be made of corrugated cardboard such as E-flute or C-flute corrugated cardboard. Outer skin may be a 1.75 mm thick corrugated cardboard, although other thicknesses may be used. The outer skin could also be constructed from thick paper such as postcard stock paper. The top, content holder, handle, and base may also be constructed from such material. Other materials are also possible. The use of such materials also provides the advantage of using recyclable materials in the construction of the package enclosure.

In one embodiment, the package enclosure 100, 100', 200, and 300 may be 180 mm tall, 400 mm long, and 120 mm wide. However, various other sized enclosures may also be provided. The present embodiments provide a lightweight and structurally sound package enclosure. Advantageously, the components may lie flat prior to construction, thereby minimizing storage, transportation, and disposal space. The present embodiments are generally boat or canoe-shaped that provides for an aerodynamic package enclosure that may have a coefficient of drag of 0.35 or less, and in some embodiments 0.28 or less. In addition, the upper surface of the disclosed package enclosure closely hugs the bottom of the UAV to provide further favorable aerodynamics that provide for improved flight characteristics during flight to a delivery site. In addition, the package enclosure in the disclosed embodiment protects the package contents from convection cooling/heating (air blowing through package). The package enclosure in the disclosed embodiments is also optimized for aerodynamics while being 0/180 degree symmetric, although aspects of the package enclosure could be asymmetric as well.

VIII. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A package enclosure for use on an aerial vehicle comprising:
    an outer skin having left and right side walls and a front end and a rear end;
    a base positioned within the outer skin, the base having a front section attached to the front end of the outer skin and a rear section attached to the rear end of the outer skin; and
    a handle upwardly extending from the front section of the base and from the rear section of the base;
    wherein prior to construction of the package enclosure, the front end and rear end of the outer skin lie flat, and an inner surface of the front end faces an inner surface of the rear end with at least a portion of the handle positioned between the front end and the rear end of the outer skin, and the front section of the base lies flat against the rear section of the base; and
    wherein downward movement of the handle causes the front and rear sections of the base move into a horizontal position while drawing in the right and left side walls into contact with the front and rear sections of the base.

2. The package enclosure of claim 1, wherein the base exerts a force against the inner surfaces of the front and rear ends of the outer skin.

3. The package enclosure of claim 1, further including a content holder positioned above the base with the handle extending therethrough.

4. The package enclosure of claim 3, wherein the content holder exerts a force against inner surfaces of the left and right side walls, and also exerts a force against the inner surfaces of the front and rear ends of the outer skin.

5. The package enclosure of claim 3, wherein the content holder includes cutouts adapted for holding contents within the outer skin.

6. The package enclosure of claim 3, wherein outwardly extending tabs are positioned on the content holder that extend through slots positioned within the right and left side walls of the outer skin.

7. The package enclosure of claim 6, wherein outwardly extending tabs are positioned on the content holder that extend through slots positioned within the front and rear ends of the outer skin.

8. The package enclosure of claim 1, wherein the right and left side walls of the outer skin slope upwardly and outwardly from the base; and
    wherein the front and rear ends of the outer skin slope upwardly and outwardly from the base.

9. The package enclosure of claim 8, wherein the outer skin has an aerodynamic shape having a coefficient of drag of 0.35 or less.

10. The package enclosure of claim 1, further including a lower base section attached to a bottom of the right and left side walls, wherein outwardly extending tabs are positioned on the lower base section that extend through slots positioned within the right and left side walls of the outer skin.

11. The package enclosure of claim 1, wherein a stabilizing footing extends outwardly from a bottom of the outer skin beyond the left and right side walls of the outer skin.

12. The package enclosure of claim 1, further including:
a first extension extending inwardly from a top of the left side wall and a second extension extending inwardly from a top of the right side wall;
a first tab upwardly extending from an upper surface on a first side of the handle and a second tab upwardly extending from an upper surface on a second side of the handle;
wherein the first tab extends through a slot on the first extension; and
wherein the second tab extends through a slot on the second extension.

13. The package enclosure of claim 1, further including:
a first section downwardly extending from a bottom of the left side wall of the outer skin;
a second section downwardly extending from the bottom of the left side wall of the outer skin;
a first section downwardly extending from a bottom of the right side wall of the outer skin;
a second section downwardly extending from the bottom of the right side wall of the outer skin;
wherein the first section extending from the bottom of the left side wall of the outer skin has a tab that extends through a first slot positioned in the left side wall;
wherein the first section extending from the bottom of the right side wall of the outer skin has a tab that extends through the first slot positioned in the right side wall;
wherein the second section extending from the bottom of the left side wall of the outer skin has a tab that extends through a second slot positioned in the left side wall;
wherein the second section extending from the bottom of the right side wall of the outer skin has a tab that extends through the second slot positioned in the right side wall; and
wherein the base is sandwiched between portions of the first and second sections extending from the left side wall, and the base is also sandwiched between portions of the first and second sections extending from the right side wall.

14. The package enclosure of claim 1, wherein a front end of the base is integrally attached to the front end of the outer skin, and a rear end of the base is integrally attached to the rear end of the outer skin.

15. A package enclosure for use on an aerial vehicle comprising:
an outer skin having left and right side walls and a front end and a rear end;
a base positioned within the outer skin exerting a force against inner surfaces of the left and right side walls of the outer skin; and
a handle upwardly extending from the base;
wherein outwardly extending tabs are positioned on the base that extend through slots positioned within the front and rear ends of the outer skin.

16. A method of constructing a package enclosure comprising the steps of:
providing an outer skin with right and left side walls, front and rear end walls, a base, and a handle, wherein the base comprises first and second base sections secured to the handle, and the first base section include a first tab extending from a front end of the first base section, and the second base section includes a second tab extending from the second base section;
inserting the first tab into a slot in the front end wall of the outer skin;
inserting the second tab into a slot in the rear end wall of the outer skin; and
pushing down on the handle to move the first and second base sections into a horizontal position while drawing in the right and left side walls into contact with the first and second base sections.

17. The method of claim 16 further including the step of inserting a content holder within the outer skin and extending the handle through a slot in the content holder.

18. A method of constructing a package enclosure comprising the steps of:
providing a package enclosure comprising:
an outer skin having left and right side walls and a front end and a rear end;
a base positioned within the outer skin, the base having a front section attached to the front end of the outer skin and a rear section attached to the rear end of the outer skin; and
a handle upwardly extending from the front section of the base and from the rear section of the base;
wherein prior to construction of the package enclosure, the front end and rear end of the outer skin lie flat, and an inner surface of the front end faces an inner surface of the rear end with at least a portion of the handle positioned between the front end and the rear end of the outer skin, and the front section of the base lies flat against the rear section of the base; and
wherein downward movement of the handle causes the front and rear sections of the base move into a horizontal position while drawing in the right and left side walls into contact with the front and rear sections of the base; and
moving the handle to cause the front and rear sections of the base to move into a horizontal position while drawing in the right and left side walls into contact with the front and rear sections of the base.

19. The method of claim 18 further including the steps of:
positioning a first tab of the handle into a slot in a first inward extension on the right side wall; and
positioning a second tab of the handle into a slot in a second inward extension on the left side wall.

20. A package enclosure for use on an aerial vehicle comprising:
an outer skin having first and second side walls and a first and second end walls;
a base positioned within the outer skin; and
a handle upwardly extending between the first and second side walls;
wherein the base includes a first base section and a second base section and the handle includes a first handle section and a second handle section, wherein the first handle section is contiguous with a first portion of the first side wall, the first portion of the first side wall is contiguous with the first end wall, the first end wall is contiguous to the second side wall, the second side wall is contiguous with the second end wall, the second end wall is contiguous with a second portion of the first side wall, the second portion of the first side wall is contiguous with a second handle section, and the second side wall is contiguous with the first and second base sections and wherein a stabilizing footing extends outwardly beyond the first and second side walls of the outer skin, and the stabilizing footing is integrally attached to the base.

21. The package enclosure of claim 20, further including first and second top sections extending from, and integrally attached to the first side wall with a slot extending between the first and second top sections.

22. The package enclosure of claim 21, wherein the handle extends through the slot positioned between the first and second top sections.

23. The package enclosure of claim 20, wherein prior to construction of the package enclosure, the left and right side walls lie flat and inner surfaces of the left and right side walls are not in contact with each other.

24. A method of constructing a package enclosure comprising the steps of:
providing package enclosure comprising:
an outer skin having first and second side walls and a first and second end walls;
a base positioned within the outer skin; and
a handle upwardly extending between the first and second side walls;
wherein the base includes a first base section and a second base section and the handle includes a first handle section and a second handle section, wherein the first handle section is contiguous with a first portion of the first side wall, the first portion of the first side wall is contiguous with the first end wall, the first end wall is contiguous to the second side wall, the second side wall is contiguous with the second end wall, the second end wall is contiguous with a second portion of the first side wall, the second portion of the first side wall is contiguous with a second handle section, and the second side wall is contiguous with the first and second base sections; and wherein a stabilizing footing extends outwardly beyond the first and second side walls of the outer skin, and the stabilizing footing is integrally attached to the base;

folding the first base section over the second base section;
folding a first handle extension over the first handle section;
folding a second handle extension over the second handle section;
folding the first handle section over itself;
folding the second handle section over itself;
folding the first end wall over itself;
folding the second end wall over itself; and
separating the first and second portions of the first side wall from the second side wall until the first and second handle sections are unfolded and in abutting contact with each other.

25. The method of claim 24 wherein a first top section is secured to the second side wall and a second top section is secured to the second side wall, and further including the steps of moving the first and second top sections into a horizontal position and securing the first top section to the first portion of the first side wall and securing the second top section to the second portion of the first side wall.

26. The method of claim 24 wherein the stabilizing footing comprises a first stabilizing footing contiguous with the first base section and a second stabilizing footing contiguous with second base section.

* * * * *